United States Patent [19]
Kakuishi et al.

[11] Patent Number: 5,481,564
[45] Date of Patent: Jan. 2, 1996

[54] RECEIVED DATA ADJUSTING DEVICE

[75] Inventors: Mitsuo Kakuishi, Yokohama; Yutaka Awata, Kawasaki; Norio Ueno; Seiji Miyoshi, both of Yokohama; Norio Murakami, Kawasaki; Atsushi Manabe, Kawasaki, all of Japan

[73] Assignee: Fujitsu Limited, Kawasaki, Japan

[21] Appl. No.: 733,983

[22] Filed: Jul. 22, 1991

[30] Foreign Application Priority Data

| Jul. 20, 1990 | [JP] | Japan | ................................ 2-190683 |
| Jul. 20, 1990 | [JP] | Japan | ................................ 2-190690 |
| Oct. 9, 1990 | [JP] | Japan | ................................ 2-269355 |

[51] Int. Cl.$^6$ .................................................. H03H 7/30
[52] U.S. Cl. ........................ 375/230; 375/232; 333/28 R; 364/724.2
[58] Field of Search .......................... 375/12, 14; 333/18, 333/28 R; 364/724.19, 724.02

[56] References Cited

U.S. PATENT DOCUMENTS

| 3,659,229 | 4/1972 | Milton | 375/14 |
| 3,868,603 | 2/1975 | Guidoux | 375/15 |
| 4,074,086 | 2/1978 | Falconer et al. | 375/14 |
| 4,500,999 | 2/1985 | Takatori et al. | 375/16 |
| 4,575,857 | 3/1986 | Murakami | 375/14 |
| 4,707,840 | 11/1987 | Nakayama | 375/98 |
| 4,789,994 | 12/1988 | Randall et al. | 375/12 |
| 4,833,691 | 5/1989 | Takatori et al. | 375/14 |
| 4,833,788 | 8/1981 | Tamburelli | 375/14 |
| 4,972,433 | 11/1990 | Yamaguchi et al. | 375/14 |
| 5,121,415 | 6/1992 | Goodman et al. | 375/14 |
| 5,142,552 | 8/1992 | Tzeng et al. | 375/14 |

FOREIGN PATENT DOCUMENTS

| 0054609 | 6/1982 | European Pat. Off. . |
| 0137213 | 4/1985 | European Pat. Off. . |
| 0174125 | 3/1986 | European Pat. Off. . |
| 0173569 | 3/1986 | European Pat. Off. . |
| 60-201716 | 10/1985 | Japan . |
| 2238932 | 6/1991 | United Kingdom . |
| 8101089 | 4/1981 | WIPO | 375/14 |

OTHER PUBLICATIONS

K. H. Mueller, "Combining echo cancellation and decision feedback equalization", *The Bell System Technical Journal*, vol. 58, No. 2, Feb. 1979, pp. 491–500.

S. Marcos et al., "Joint adaptive echo cancellation and channel equalization for data transmission", *Signal Processing*, vol. 20, No. 1, May 1990, pp. 43–65.

Patent Abstracts of Japan, vol. 14, No. 178, Apr. 10, 1990 for JP-A-2-031524 by Hiroto, Feb. 1, 1990.

Partial European Search Report, The Hague, search completed Sep. 2, 1992.

"Digital Signal Processing", Institute of Electronics, Information and Communication Engineers, pp. 224–250.

Takatori et al., "Low-power line equalizer for digital subscriber loop", *IEEE Global Telecommunications Conference Globecom '84*, vol. 1, pp. 26–31.

Inami et al., "Adaptive line equalizer LSI for ISDN subscriber loops", *IEEE Journal of Solid–State Circuits*, vol. 23, No. 3, Jun. 1988, pp. 657–663.

Ando et al., "A DSP line equalizer VLSI for TCM Digital Subscriber–Line Transmission", *IEEE Journal of Solid–State Circuits*, vol. 23, No. 1, Feb. 1988, pp. 118–123.

Patent Abstracts of Japan, vol. 12, No. 101 (E–595) for JP-A-62-231526.

European Search Report, The Hague, Mar. 10, 1993.

*Primary Examiner*—Stephen Chin
*Assistant Examiner*—T. Ghebretinsae
*Attorney, Agent, or Firm*—Staas & Halsey

[57] ABSTRACT

A digital adaptive equalizer equalizes received signals through digital filtering operations by changing filtering coefficients. It comprises a coefficient calculating unit for calculating the filtering coefficients by using one kind of parameters, such as distance, as an input to a function corresponding to the filtering coefficients and a filtering operation executing unit for executing digital filtering operations based on the filtering coefficients. A variable lag filter for adjusting the phase delay of received received signals is provided. A coefficient converting unit calculates a part or all of tap coefficients of the filter using at least one piece of timing control information.

18 Claims, 27 Drawing Sheets

Fig. 7A  INPUT

Fig. 7B  OUTPUT

Fig. 7C  JUDGING TIMING

RECEIVED DATA ADJUSTING DEVICE

BACKGROUND OF THE INVENTION

This invention pertains to a digital adaptive equalizer for equalizing signal distortion which varies with the transmission distance and setting gain by a digital signal and a timing controller provided in a transmission interface device. The digital adaptive equalizer is provided, for instance, in a digital subscriber line transmission interface device for performing high-speed data transmission by multi-value pulse signals, e.g. having one of four value levels in the amplitude direction, simultaneously being transmitted in both emitting and receiving directions over existing metallic pair cable telephone subscriber lines.

It has become a wide-spread practice to transmit modulated digital signals over existing analog telephone lines, etc. Here, when high-speed digital transmission is performed, it is essential to equalize the loss-frequency characteristics (hereafter referred simply as loss characteristics) of the signal amplitude in the metallic cable connecting a subscriber terminal with a switching system at an exchange station.

At present, with the advances of digital signal processing techniques and LSI technologies, research is aimed at developing a digital signal processing LSI (DSP) to realize an amplitude equalizer for equalization, including the functions of a balancing network or a variable attenuator.

Although digital filtering is used when a digital signal processing LSI compensates the loss characteristics of a cable, the following points need to be remembered.

Since the distance between a subscriber terminal and its exchange station is not constant, each subscriber has a different cable length, which causes the loss characteristics of the cable to change, as shown in FIG. 1. Accordingly, an amplitude equalizer in a digital subscriber line transmission interface device needs to be an adaptive equalizer capable of changing its frequency characteristics to be able to cope with varying loss characteristics from subscriber terminals to their exchange station. An adaptive equalizer is defined as an equalizer capable of changing its own frequency characteristics by changing the parameters of the functions defining the equalizer itself according to the cable length.

The frequency band generally used is 80 kHz and the transmission band is from 0 to 80 kHz, including a direct current component.

FIG. 2 shows the configuration of a conventional digital subscriber line transmission interface device.

After a hybrid transformer 1 separates the signal transmitted from a subscriber through an analog pair cable or transmission cable 2, a low pass filter (RLF) 3 on the receiving side limits the band of the signal to the frequency bandwidth of not more than ½ of the sampling frequency of an A/D converter, for example, 15.36 MHz. The transmission signal produces a pulse at 80 kHz and this spectrum of the transmission signal is condensed to 0 to 40 kHz theoretically. Thus a frequency more than 40 kHz may be cut off by a low pass filter. However, practically speaking, when a frequency more than 40 kHz is completely cut off, the wave form changes greatly due to influence of a delay characteristic of the filter and thus a filter for cutting off a frequency more than 120 kHz is used. Namely, more than ⅜ of the sampling frequency is cut off. Then, an over-sampling type A/D converter A/D comprising a modulator 4 and a decimation filter 5 converts the signal into a digital reception signal and inputs it to a DSP 6. The over-sampling type A/D converter which is used as the A/D converter performs a sampling at a frequency several tens to several hundreds higher than the basic sampling frequency (which is 80 kHz, for example) and converts an input signal to a digital signal of 1 bit, 15.36 MHz, for example. The modulator 4 comprises an integrator, comparator, current delay circuit, and one bit D/A converter. Then, the high frequency noise of the output of the modulator 4 is removed therefrom by a decimation filter 5 and the signal is changed to a low-speed digital signal and is thereby converted to a low-speed digital signal of multiple bits (e.g., 14 bit, 80 kHz). The digital reception signal passes through a subtracter 7, an amplitude equalizer (AEQL) 8 and a decision feedback equalizer (DFE) 9. The amplitude equalizer (AEQL) is aimed at correcting the change of the amplitude of the signals transmitted along a cable.

The frequency loss characteristics of the cable changes depending on the length of the cable. The loss change by 15 dB even in a low frequency band and it is necessary to change an amplitude coefficient of a gain of the equalizer between 1 and 5. The amplitude varies more widely in higher frequency bands. Therefore, the amplitude of the received signal varies widely. The amplitude equalizer (AEQL) 8 corrects such variations.

In contrast, the decision feedback equalizer (DFE) is aimed at waveform-shaping a tail portion of the received waveform (postcursor) by adjusting the amplitude and the frequency characteristics and thus perform a fine correction.

The amplitude equalizer also aids the decision feedback equalizer but the decision feedback equalizer cannot perform the function of the amplitude equalizer. The decision feedback equalizer cannot control the portion of the main amplitude (main cursor). After the digital reception signals pass through the decision feedback equalizer (DFE) 9, the DSP 6 outputs the digital signal as digital reception signal 10.

On the other hand, having undergone necessary digital signal processings (such as binary-to-multiple value conversions) by a coder COD 11, the digital signal supplied to the DSP 6 is outputted as digital transmission signal 12. Thus, a D/A converter 17 makes the digital transmission signal outputted from the DSP 6 analog, and a low pass filter (SLF) 13 on the receiving side limits less than about ⅜ of the sampling frequency. After going through a driver circuit (DRV) 14 and the hybrid transformer 1, the analog transmission signal is sent from the analog pair cable 2 to subscribers.

Here, since a part of the transmission signal bound for the analog pair cable 2 from the hybrid transformer 1 affects the receiving side as an echo component and is inputted, as a part of the digital reception signal, to the DSP 6, the receiving side needs to cancel the above echo component. Hence, an echo canceler (EC) 15 generates, as an echo replica component, the above component from the digital transmission signal, which the subtracter 7 subtracts from the digitized reception signal, so that the echo component is canceled. In this case, the decision feedback equalizer (DFE) 9 is connected to the output of the amplitude equalizer (AEQL) 8 on the receiving side and outputs the error between the reception signal and a decision symbol value which is required for generating the echo replica component in echo canceler 15. The error signal from the decision feedback equalizer a is input to the echo canceler 15. The error signal is provided by the symbol values ($\pm 1$, $\pm 3$) corresponding to the difference between the output value and the input value of the decision feedback equalizer 9 the polarity alone may be used. The decision feedback equalizer (DFE) 2 also has a function of adaptively controlling parameters of a transversal filter in the equalizer 8 to remove intersymbol interference of the signals received from the sending station. For this purpose an error between the received signal and the symbol value of the decision result is obtained.

Combinations of pieces of the hardware of the DSP 6 and their controlling microprograms realize the respective functions of the above DSP 6, or hardware can be used to realize these functions without using microprograms.

The amplitude equalizer (AEQL) 8 in the DSP 6 equalizes (adjusts) the loss of the digital reception signals for loss having frequency characteristics in the analog pair cable 1. Further, the amplitude equalizer (AEQL) 8 ordinarily has an AGC (automatic gain control) function. As shown in FIG. 1, the the loss frequency characteristics of the cable increase as the length of the cable increase. Since the loss in low frequencies becomes commensurately larger, not only the gradient but also the gain needs to be increased, which is performed by the AGC function.

A conventional amplitude equalizer 8 uses selected one of three to five types of filtering coefficients predesignated for the cable length of the analog pair cable 2, so that the amplitude equalizer 8 has equalization characteristics (frequency transmission characteristics) in accordance with the cable length, such as those shown in FIG. 3, corresponding to the loss frequency characteristics shown in FIG. 1.

At this time, per a conventional method, a sum-of-squares calculator 16 shown in FIG. 2 obtains the electric power of the signals inputted to the amplitude equalizer 8 for every predetermined time period by calculating the sum of the squared amplitude of the signals, so that the proper filtering coefficient, i.e. the equalization characteristics, is obtained commensurately with the value of the electric power. For example, time periods during which a sum-of-squares is small result in filtering coefficients having steep high pass characteristics and large gains in low frequencies corresponding to long distance cables, because the signal amplitudes for such time periods are generally smaller.

However, since the above described prior art example of the amplitude equalizer 8 selectively uses several kinds of discrete filtering coefficients, it cannot precisely adjust the filtering coefficients in response to continuous small changes in the cable lengths. That is, a problem remains that a significant error exists in the digital reception signal after equalization, when the necessary equalization characteristics are somewhere in the middle of a pair of predesignated equalization characteristics and do not exactly match any of them. For example, when filters whose low frequency gains changes from 0 to 16 dB at an interval of 2 dB are provided as a plurality of filters, an error of 1 dB remains in a case of a cable with 7 dB loss.

A further problem is that the calculation of the sum-of-squares is necessary and thus the load of DSP 6 increases.

An even bigger problem is that calculation of the sum of the squares needs to be repeated several times until the phases match, because the obtained amplitudes are not exact when the sampling phase is not matched with the signal phase.

In response to the above problems, a digital variable filter which calculates filtering coefficients by having a special conversion function converting a parameter for the cable length has been proposed, but it is not applicable to a transversal filter, because the conversion function is so special. Further, although this applicant disclosed a digital adaptive equalizer applicable to a transversal filter in the 1990 Japanese Patent Application No. 53787, since that invention was premised on the decibel indication of the loss characteristics proportional to the cable length, the invention has a problem that it cannot be applied to other loss characteristics.

Another prior art device obtains an average value of amplitudes at a plurality of times which do not overlap each other and compares it with a reference level. This is performed at two stages comprising a coarse adjustment for changing a level exponentially and a fine adjustment for changing a level at a fine step. This prior art device requires a serial type multiplier for performing a multiplication of 16 bits×8 bits and thus has to provide an exclusive hardware.

A decision feedback equalizer equalizing intersymbol interference on the time axis is used for a digital signal receiving device. Also, a configuration is adopted such that an automatic gain control amplifier or a $\sqrt{f}$ equalizer compensates changes in attenuation characteristics or frequency characteristics of a transmission path. It is desired to realize such a configuration economically.

A conventional line equalizer has a configuration such as that shown in FIG. 4, for example. An A/D converter 21 converts a reception signal having waveforms corresponding to transmission codes e.g. to a 10-bit digital signal, which an automatic gain control amplifier 22 amplifies to a predetermined level, based on operations for reception signal power. A $\sqrt{f}$ equalizer (EQL) 23 equalizes the attenuation characteristics of the transmission paths, and a slicer 24 providing a decision threshold eliminates intersymbol interferences.

An adder 25, a slicer 24 and an equalizing part (DFE) 26 form the decision feedback equalizer 27. The equalizing part 26 generates intersymbol interference components to be supplied to the adder 25, based on the decisions made by the slicer 24.

FIG. 5 is a block diagram of a conventional decision feedback equalizer 27, described earlier, having an n-tap configuration, where 28 denotes an input terminal, 29 denotes an output terminal, 30 denotes an adder, 31 denotes a slicer (DEC), 32 denotes an adder, 33 denotes a tap coefficient updater, 34 denotes an adder, 35-1 through 35-n denote lag elements (T), 36-1 through 36-n denote coefficient multipliers.

A case in which AMI codes are used as transmission path codes is explained as an example. An adder 30 adds the reception signal $X_k$ at time k to the intersymbol interference component $R_k$ having the negative sign to produce the equalized signal $F_k$, and the slicer 37 determines whether the reception signal is "±1" or "±3" through level decisions. Lag elements 35-1 through 35-n sequentially lags the decision output signal $a_k$ by one baud rate period. Output signals from respective lag elements are supplied to coefficient multipliers 36-1 through 36-n as well as tap coefficient updater 33.

The tap coefficient updater 33 controls the coefficients of the respective coefficient multipliers 36-1 through 36-n, so that error signals $e_k$ are minimized. The respective coefficient multipliers 36-1 through 36-n multiply the tap coefficients $C_{1k}$ through $C_{nk}$ by the outputs from the lag elements 35-1 through 35-n, which products are added by the adder 34. Then, the adder 30 adds the intersymbol interference components $R_k$ of the result of the addition, so that the intersymbol interference components $R_k$ are subtracted from the reception signals $X_k$, thereby eliminating the intersymbol interference included in the reception signal $X_k$.

FIG. 6 illustrates the relations between a reception signal single pulse response and tap coefficients. $C_1$ through $C_5$ are intersymbol interference components for single pulse responses. By forming tap coefficients $C_{1k}$ through $C_{5k}$ which are the same as those components, and by having the adder 34 generate intersymbol interference components $R_k$, the adder 30 can eliminate intersymbol interference. The automatic gain control amplifier 22 in the conventional line equalizer described earlier amplifies the reception signal to a predetermined level based on power detection of the reception signals. A $\sqrt{f}$ equalizer (EQL) performs equalizaton through peak detection, for example. Hence, its configuration is more complex than those of the amplifiers having fixed gain or equalizers having fixed characteristics.

As described above, it has become wide spread practice to transmit digital signals modulated for transmission over analog telephone lines. This requires a digital subscriber line transmission interface unit for restoring the original signal waveforms distorted by the transmission characteristics of metallic cables.

A digital subscriber line transmission interface unit often has a function of simultaneously transmitting and receiving digital data quantized to four values (e.g. ±1 and ±3) in amplitude at a transmission speed of 80 kbaud (kilo bauds). There are two types for this kind of device, one being a network side device (Line Terminator: hereafter abbreviated as LT) and another being a terminal side device (Node Terminator: hereafter abbreviated as NT).

It is crucial to synchronize the timings of the actions over the entire network for enabling signal transmission. In this case, the master clock on the network side becomes the reference. The NT receives the signals emitted from the LT based on the reference, and the NT's timing controlling circuit acts based upon the received signals, so that the timings on the NT's side are set. Since the NT sends signals at the timings so determined, the frequencies at the timings when the LT receives signals match the frequencies of the timings when the NT sends signals, but the phases are different. The phase difference is determined by the lag time resulting from the cable length and the difference between the reception timing and the emission timing at NT. Thus, the LT needs to set the phase difference to the optimal value by adjusting it when communication begins.

Meanwhile, a digital subscriber line transmission interface unit needs to set coefficients of the transversal filter in a decision feedback equalizer and an echo canceler, as well as the NT's timing adjustments. Although almost all of these coefficients are configured to be able to change adaptively, they need to be set initially, for which generally the LT and the NT mutually send training signals to each other for a certain period of time, thereby receiving each others' training signals, which sets timings and filter coefficients.

These adjustments are divided into the adjustment of the echo canceler and the adjustment of the receiver circuit, such as the adjustment of the reception timings and the decision feedback equalizer. That is, the emission training pulses of the near end must adjust the coefficients of the echo cancelers, whereas the training pulses of the far end must adjust the reception system circuit.

Since there are cases in which the reception system circuit and the echo canceler cannot be simultaneously adjusted in the initial training stage, in reality, the NT sends training pulses, after the NT ceases outputting training pulses, the LT outputs training pulses, and then both output training pulses simultaneously.

In this case, the NT uses the training pulses it outputs by itself and adjusts the echo canceler at its own clock timings. Although the LT can receive the training pulses from the NT at this time, since it is not defined to make the pulse numbers sufficiently large, the LT's reception system cannot be adjusted during this period.

Next, the LT adjusts the echo canceler at clock timings of its own, and the NT adjusts the reception system, when only the LT outputs training pulses.

Subsequently, the NT outputs training pulses, while the LT keeps outputting training pulses. The LT's reception system circuit is adjusted during this time period. The NT's reception system circuit has already adjusted the timings at which the NT outputs training pulses per the training pulses from the LT, so that the timings match the correct frequencies, i.e. the network frequencies. Hence, the timing adjustments for the LT's reception system circuit are nothing but matching the phases.

Since the NT at the terminal end needs to change the clock frequencies of its own in accordance with the timings for the received pulses, the emission frequencies change accordingly. However, since the time difference between the emission timing and the reception timing can be set arbitrarily, the echo canceler need not be adjusted any more by setting the emission timing so that the difference becomes the same as that when the NT's echo canceler is adjusted.

However, since the LT has set its clock timing from the network, it cannot change its emission timings in correspondence with the received training pulses. But instead, either the echo canceler already adjusted needs to be readjusted per the timings of the received training pulses or the sampling signals for the echo canceler after the echo is canceled need to obtain the signals at the timings when their phases are changed.

The following is a description of a such conventional example of a timing controlling device.

After the LT trains the echo canceler with the training pulses sent from the LT, the signals are received for training at the timings when the echo canceler performs training. Thereafter, the timing is gradually changed so that the error is minimized. By gradually changing the timings, the tap coefficients for the echo canceler change in connection with the timing changes, the echo canceler can maintain the trained state. When the echo canceler maintains the trained state, since other circuits such as the decision feedback equalizer can be optimized relatively easily, when the timings do change, circuits other than the echo canceler such as the decision feedback equalizer immediately follows the new timings.

As so far described, since the respective circuits in the reception system can observe the output errors e.g. from a decision feedback equalizer, the timings at which the errors are minimized become the best reception timings.

The following is a description of another conventional example of the timing control device.

After the echo canceler is trained, by supplying the received signals through the echo canceler and then through lagged filters having fixed lag periods, the timings are changed. In this case, the combination of constant delay time filters minimizes the error obtained, by changing the connections among a plurality of lag filters having different fixed lag periods.

Here, the relationships between the timings and the lagged periods are briefly explained by referring to FIGS. 7A, 7B and 7C. FIGS. 7A to 7C show an example of digital input signal series, which show single pulse response waveforms. Since the values actually obtained are sampling values, only the values at the bold lines at the timings shown by upward pointing arrows in FIG. 7C are obtained. Since the input signal column shown in FIG. 7A has large amplitudes at a plurality of timings, the intersymbol interference cannot be set to zero. A digital filter can lag the input signal series per its phase delay characteristics. The phase delay characteristics of the digital filter of the minimum phase shifting type are automatically set when the amplitude characteristics are determined. Thus, a mere use of the minimum phase shifting type filter cannot cut, for example, only a high frequency component without causing distortion. Thus, a filter having a transfer function including a term for distortion is generally used for shifting the times, as shown in FIGS. 7A and 7B, without changing the waveforms of input signals. FIG. 7B shows an output signal series obtained by a variable lag filter causing the input signal series shown in FIG. 7A to lag by the time equivalent to a half of the sampling cycle (the cycle period of the decision timing shown in FIG. 7C). Since the output amplitudes at times other than predetermined timings corresponding to FIG. 7A are almost zero, the timing adjustments are known to have worked well.

As described earlier, a plurality of lag filters respectively having average and different phase delay characteristics are provided so that, when their connections are changed to find the combination that minimize error, the timing adjustments are completed. Since the echo canceler need not be readjusted in this case, the time required for timing adjustments is shortened.

Of the conventional methods for timing adjustments, the first prior art device described previously requires the entire reception system circuit to be adjusted by readjusting the echo canceler, since the optimal timings for the reception system circuits are not known when the echo canceler is adjusted.

However, there are cases in which timings are greatly different in the beginning. The initial adjustments of the LT takes a significantly long time, and the hardware size increases because of a need for storing a large scale program.

On the other hand, although the second prior art device can cause the time required for timing adjustments to be shortened and the processing programs can be simplified, lag filters having fixed lag times, such as ½, ¼, ⅛, 1/16, 1/32, ... of the sampling period need to be provided, which causes an increase in filter size. When these processes are performed by digital signal processings, they don't directly cause an increase in hardware size. However, the degree of the entire filters becomes higher, and the processing volume for the operation necessarily increases, which in turn causes a problem in that as the hardware increases so does the power consumption for executing the process.

SUMMARY OF THE INVENTION

An object of the invention is to quickly and securely realize the optimum equalization characteristics with a small processing load.

Another object of the invention is to realize automatic gain control or equalization of transmission paths with a simple configuration.

A further object of the invention is to shorten the time necessary for convergence in the timing adjustments and to reduce the processing volume.

A feature of the present invention resides in a digital adaptive equalizer for equalizing signals through digital filtering operations by adaptive filtering coefficients, comprising coefficient calculating means for calculating the filtering coefficients by using one kind of parameters as an input to function corresponding to the filtering coefficients and filtering operation executing means for executing digital filtering operations based on the filtering coefficients.

Another feature of the present invention resides in a line equalizer equipped with an automatic gain control amplifier in the preceding stage of a decision feedback equalizer wherein the decision feedback equalizer forms tap coefficients of a main cursor together with tap coefficients of a postcursor and the automatic gain control amplifier receives, as gain control signals, tap coefficients of the main cursor.

A further feature of the present invention resides in a timing adjustment apparatus for adjusting the group delay of the signal from a filter, comprising digital filtering means of a transversal type of which a transmission function has non-minimum phase transition characteristics, the digital filtering means being a variable lag filter for adjusting the group delay of the received signal and coefficient converting means for calculating a part or all of tap coefficients of the digital filtering means by converting at least one piece of timing control information.

DESCRIPTION OF THE PREFERRED EMBODIMENT

Figure 8:
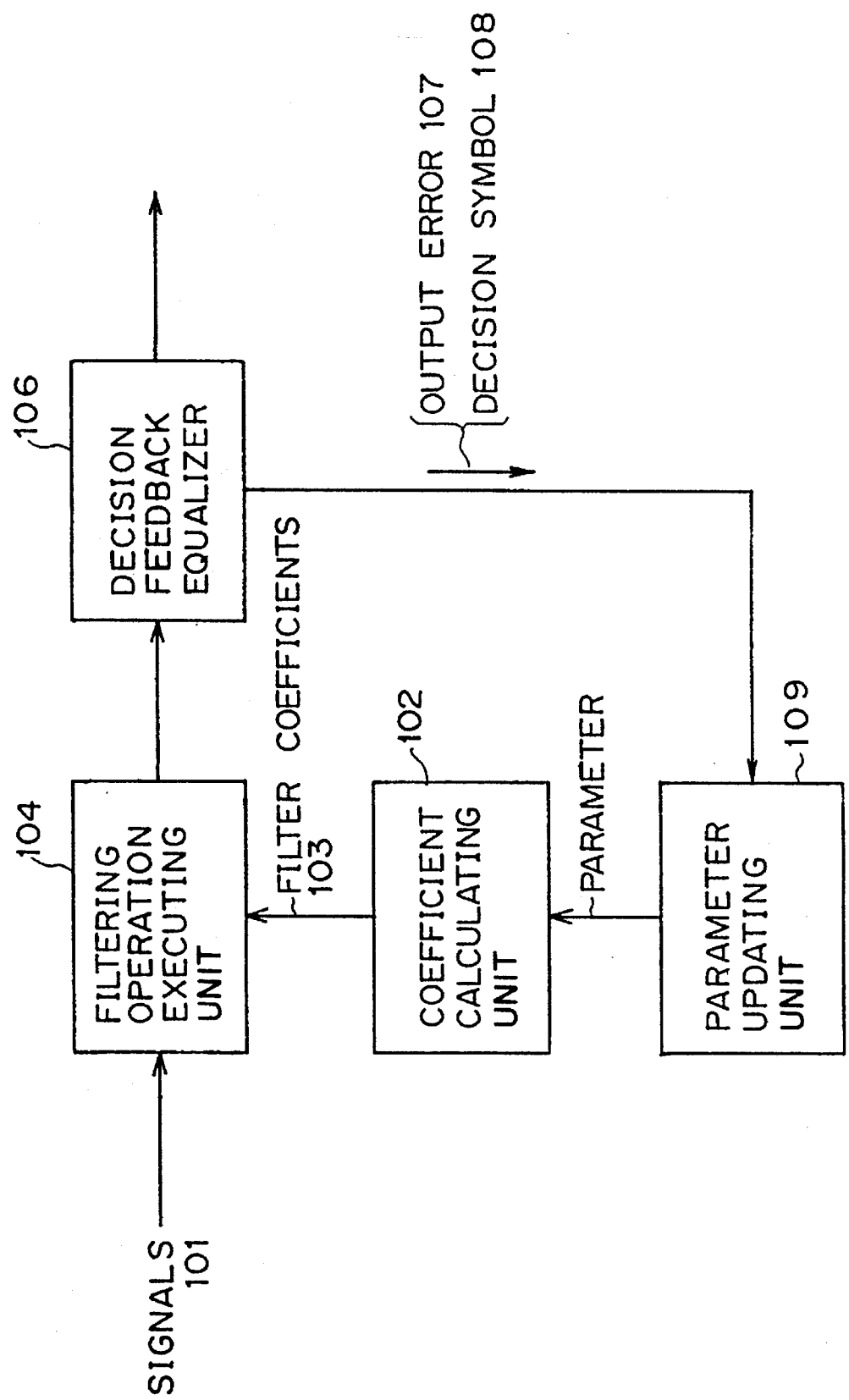
FIG. 8 is a block diagram of the principle of an embodiment according to the present invention.

FIG. 8 is a block diagram of an embodiment of this invention. This invention is premised on a digital adaptive equalizer for equalizing signals 101 through executions of digital filtering operations by changing filtering coefficients 103. The digital adaptive equalizer is set, e.g. in a digital subscriber line transmission interface device for simultaneous communications in both emission and reception directions by multiple value pulse signals.

A first element of the digital adaptive equalizer is a coefficient calculating unit 102 for calculating the filtering coefficients 103 through functionally transforming one kind of parameters 105 used as an input to a function corresponding to the respective filtering coefficients 103. Here, the one kind of parameters 105 is a value corresponding to the length of the cable over which signals 101 to be equalized are transmitted. In other words, the parameters monotonically increase with the length of the cable and do not increase in proportion to the amount of increase of the cable length. Meanwhile, plural pairs comprising the one kind of the parameters 105 and the corresponding filtering coefficients 103 approximately determine the above described function, for example. The functions corresponding to respective ones of the filtering coefficients are defined as either n dimensional linear polynomials or exponential functions with their input variables being the value of the one kind of parameters.

A second element of the digital adaptive equalizer is a filtering operation executing unit 104 for executing digital filtering operations based on the respective filtering coefficients 103. The filtering operation executing unit is e.g. a transversal type filter.

Further to the above configuration, this invention can add the following elements to the digital adaptive equalizer.

That is, a third element of the digital adaptive equalizer considered by this invention, when the digital adaptive equalizer is connected to a decision feedback equalizer 106, is a parameter updating unit 109 for sequentially optimizing the value of the one kind of the parameters 105 based on a decision symbol 108 and an output error 107 outputted from the decision feedback equalizer 106.

Since this invention enables a change in one kind of the parameters 105 to continuously determine the filtering coefficients 103, i.e., the transmission characteristics, for the filtering operation executing unit 104, the necessary equalization characteristics are uniquely determined, thereby minimizing the signal error rate.

One embodiment of the digital adaptive equalizer has such a configuration that its output stage is connected to a decision feedback equalizer 106. The parameter updating unit 109 sequentially converges the value of the one kind of the parameters 105 to the optimum, based on the decision symbol 108 and the output error 107 outputted from the decision feedback equalizer 106. As a result this invention realizes a fast and securely converging digital adaptive equalizer, which reduces the processing amount and therefore the physical dimensions of the hardware.

Especially, since the associated filtering coefficients 103 are updated concurrently with the changes in the one kind of the parameters 105, this invention realizes a converging speed far faster than that of a prior art device which independently updates the respective filtering coefficients.

Besides, processes are simplified and digital signals are easily processed, because the process for determining the filtering coefficients 103 does not require a calculation of the sum of the squares but instead uses the same algorithm as that for the coefficient correction by the decision feedback equalizer 106, unlike any prior art example.

Embodiments of this invention are described as follows by referring to the attached drawings.

Figure 9:
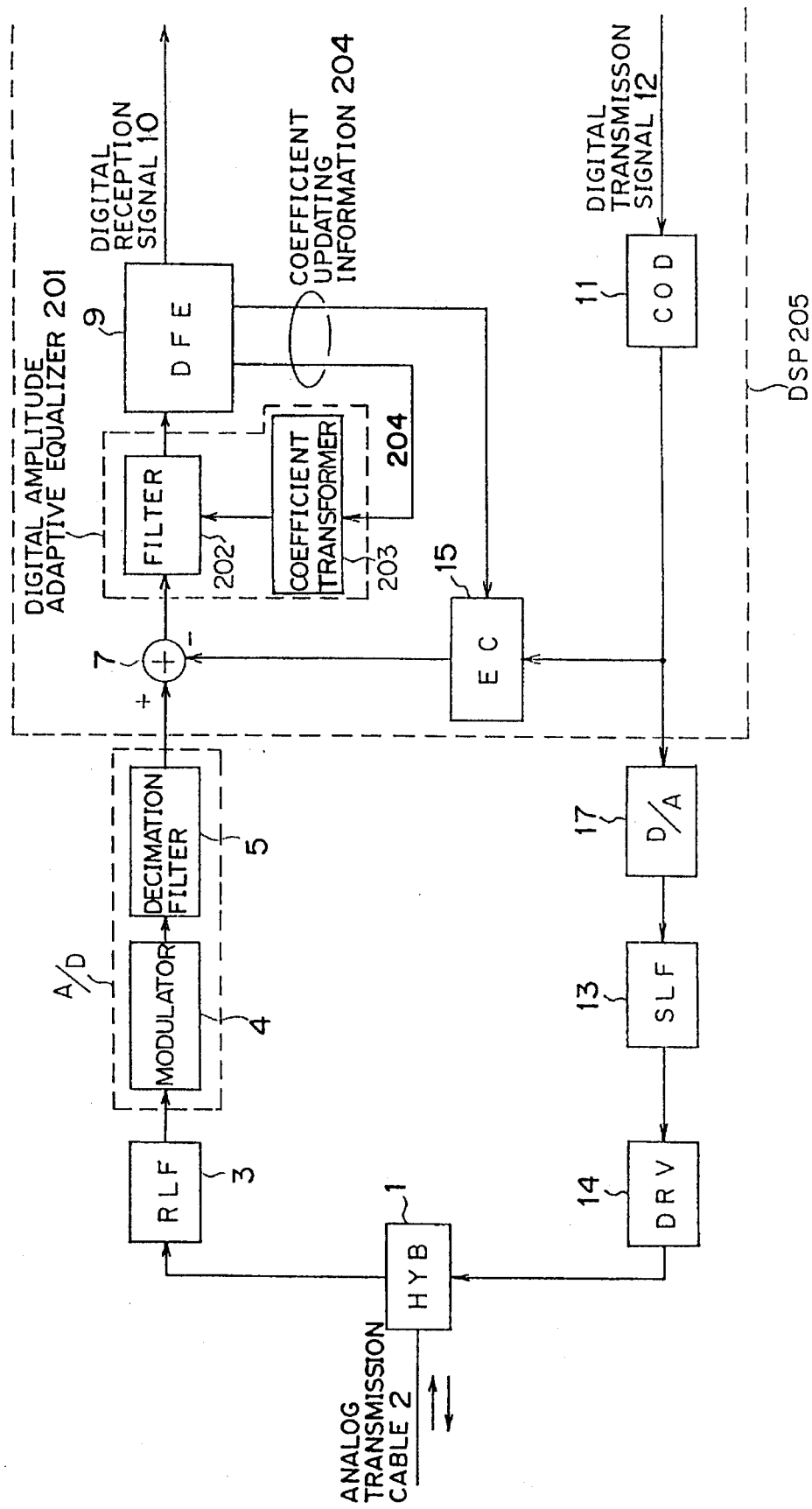
FIG. 9 is a block diagram of an embodiment of a digital subscriber line transmission interface device according to this invention.

FIG. 9 is a block diagram of an embodiment of a digital subscriber line transmission interface device according to this invention.

Figure 2:
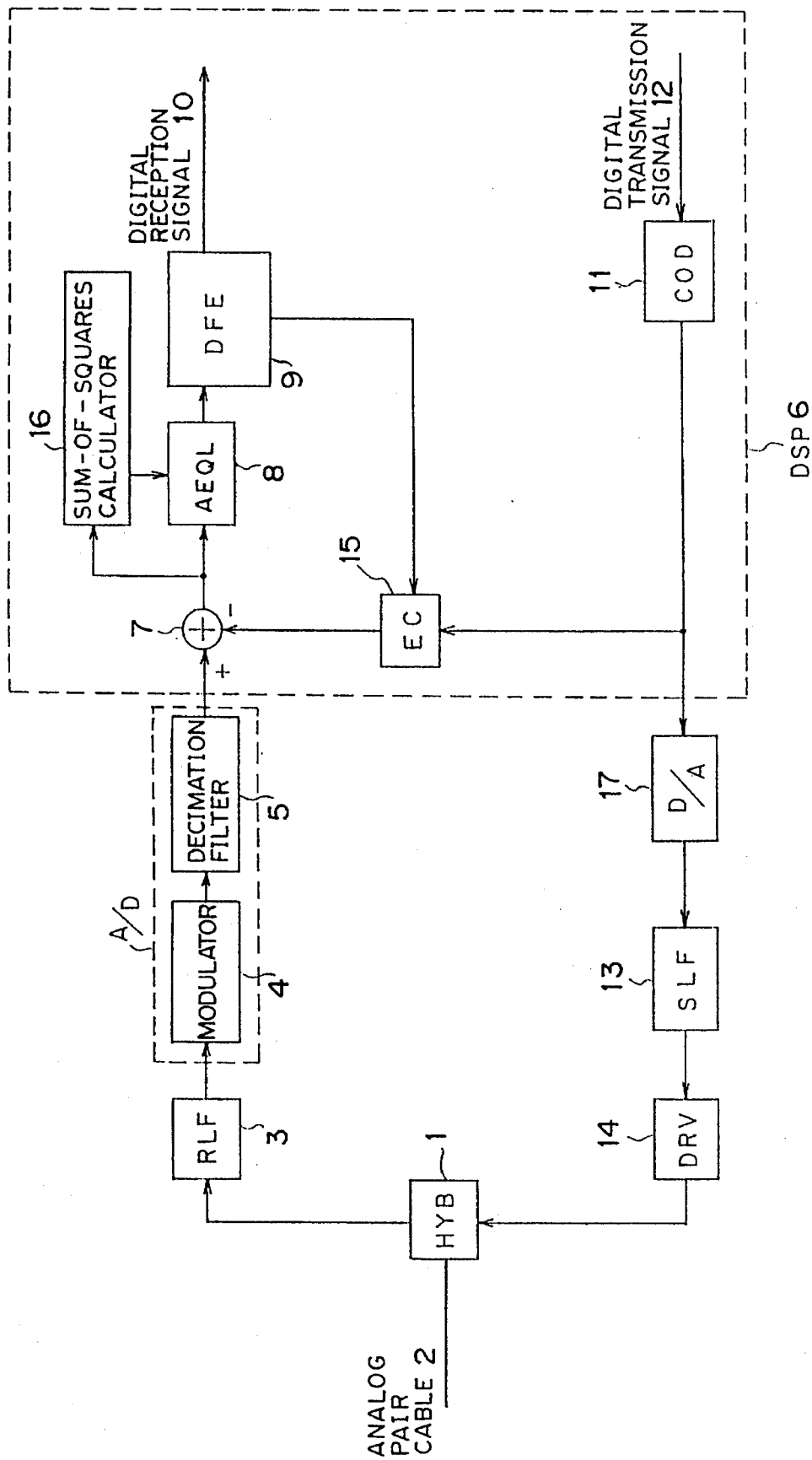
FIG. 2 is a block diagram of a prior art example.

Since the parts in FIG. 9 with the same number as those in FIG. 2 have the same functions, their operations are not explained again.

What is different from the prior art shown in FIG. 2 is that the configuration shown in FIG. 9 includes a digital amplitude adaptive equalizer 201 in lieu of the amplitude adaptive equalizer and the sum-of-squares calculator and that outputs from the decision feedback equalizer (DFE) 9 are inputted not only to the echo canceler (EC) 15 but also as coefficient updating information 204 to a coefficient transformer 203 in the digital amplitude adaptive equalizer 201.

As described above, the output of the decision feedback equalizer 9 comprises an error signal (e) and an output symbol (a) after a decision is made. They are output at the frequency of the baud rate and thus the output at time n can be expressed as $e_n$ and $a_n$.

The error $e_n$ is a function of the past received signal series and a single pulse response characteristic. It can be expressed as follows.

$$e_n = k_0\, a_n - a_n + k_1\, a_{n-1} + k_2\, a_{n-2} + k_3\, a_{n-3} + k_4\, a_{n-4} + \ldots$$

where $k_0$, $k_1$, and $k_2$ are amplitudes at respective sampling points of the solitary pulse response characteristics of the received signal. The symbol $k_0$ represents the amplitude of the pulse and is preferably equal to 1. The symbols $k_1, k_2, \ldots$ represent the amplitude at sampling times corresponding to the tail portion and are preferably 0. The average value of the product of the error and the output symbol is set to be $E[e_n \cdot a_n]$.

The following equation is provided.

$$\begin{aligned} E[e_n \times a_n] &= E[(k_0 a_n - a_n + k_1 a_{n-1} + k_2 a_{n-2} + \ldots)a_n] \\ &= E[(k_0 - 1)a_n a_n] + E[k_1 a_{n-1} a_n] + E[k_2 a_{n-2} a_n] + \ldots \end{aligned}$$

Suppose that the relation between the symbols at different times does not exist.

$$= E[(k_0 - 1) a_n a_n]$$
$$= (k_0 - 1) E[a_n a_n]$$

In the above equations as $E[a_n \cdot a_n] > 0$, it can be detected by obtaining $E[e_n \cdot a_n]$ whether $(k_0-1)$ is positive or negative. When $k_0=1$, $$E[e_n \cdot a_n] > 0$$

The value of the parameter which affects the amplitude severely can be sequentially obtained by using the above relation and the following equation, when the parameter is expressed as $X_n$ at time n.

$$X_{n+1} = X_n \pm \alpha e_n \cdot a_n$$

or $$X_{n+1} = X_n \pm \alpha sgn[e_n] \cdot sgn[a_n]$$

where $\alpha > 0$

Where the sign is "−" then $k_0$ increases when the parameter $X_n$ increases and in contrast if the sign is "+" then $k_0$ decreases when the parameter $x_n$ increases.

The polarity can be obtained by detecting only the direction. Therefore, merely the following calculation is sufficient.

$$sgn[e_n] \cdot sgn[a_n]$$

Next, first and second embodiments of the digital amplitude adaptive equalizer 201 shown in FIG. 9 are explained in this order.

Figure 10:
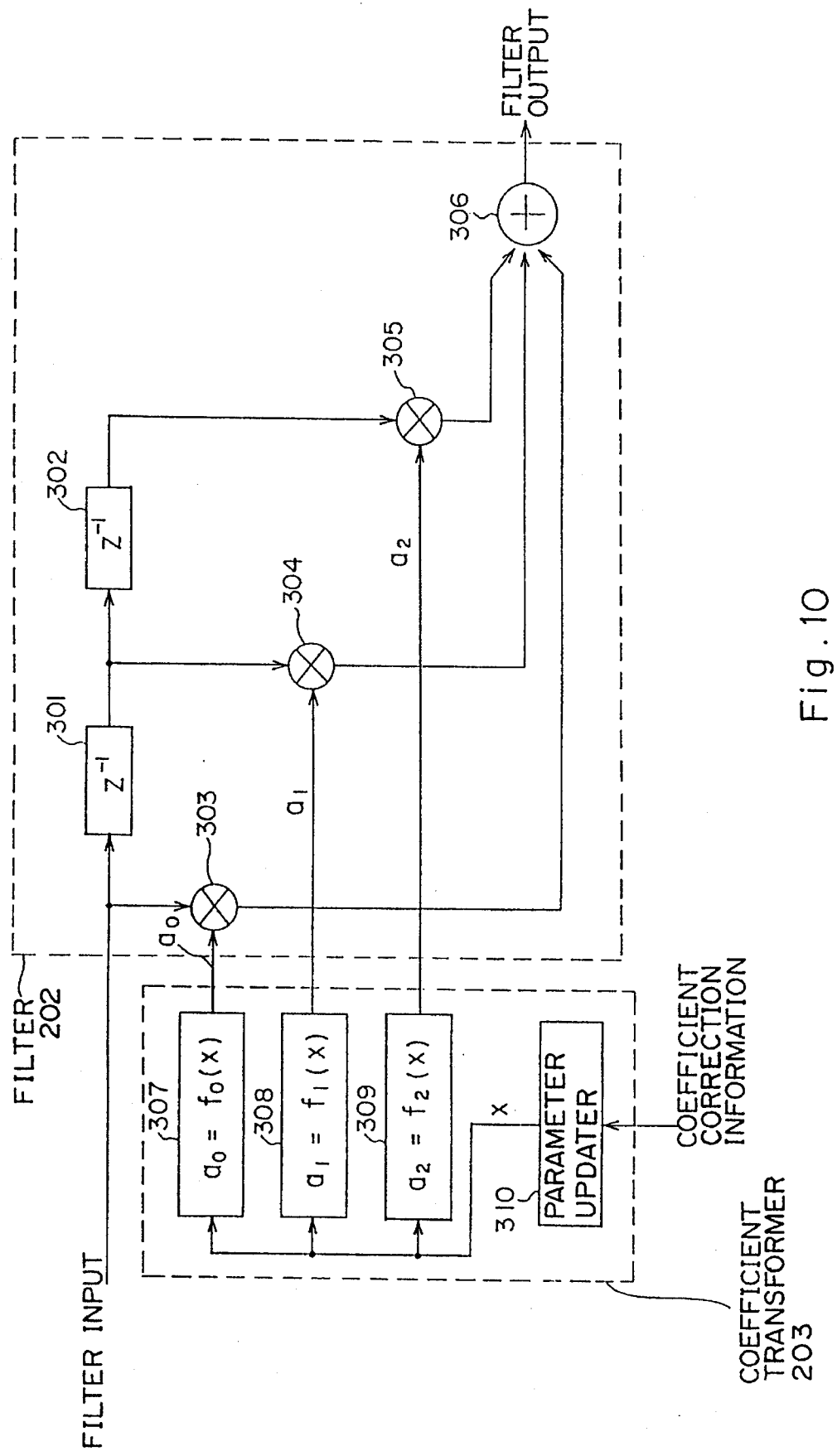
FIG. 10 is a block diagram of an embodiment of a digital amplitude adaptive equalizer.

FIG. 10 shows a configuration of an embodiment of the digital amplitude adaptive equalizer 201 shown in FIG. 9.

A filter 202 forms a three-tap second-order transversal filter with the following configuring elements. A lag element 301 lags filter inputs by one whole sampling period. A lag element 302 further lags outputs from the lag element 301. A multiplier 303 multiplies filter inputs by a filtering coefficient $a_0$. A multiplier 304 multiplies outputs from the lag element 301 by a filtering coefficient $a_1$. A multiplier 305 multiplies outputs from the lag element 302 by a filtering coefficient $a_2$. An adder 306 adds the respective outputs from the multipliers 303, 304 and 305, thereby outputting the sum as a filter output. The coefficient transformer 203 is configured by coefficient calculators 307, 308, and 309, as well as a parameter updater 310.

The operations of the above described embodiment of the digital amplitude adaptive equalizer 201 are explained below.

First of all, the transfer function of the filter 202 shown in FIG. 9 is expressed as follows:

$$H(z^{-1}) = a_0 + a_1 z^{-1} + a_2 z^{-2} \quad (1)$$

where $z^{-1} = \exp(jwT)$, with w being an angular frequency and T being a baud rate period. Here, if the filtering coefficients $a_0$, $a_1$ and $a_2$ are re-expressed as functions of a parameter x $$a_0 = f_0(x)$$
$$a_1 = f_1(x)$$
$$a_2 = f_2(x) \quad (2)$$

the transversal filter changes its characteristics continuously by changing the value of x.

Figure 1:
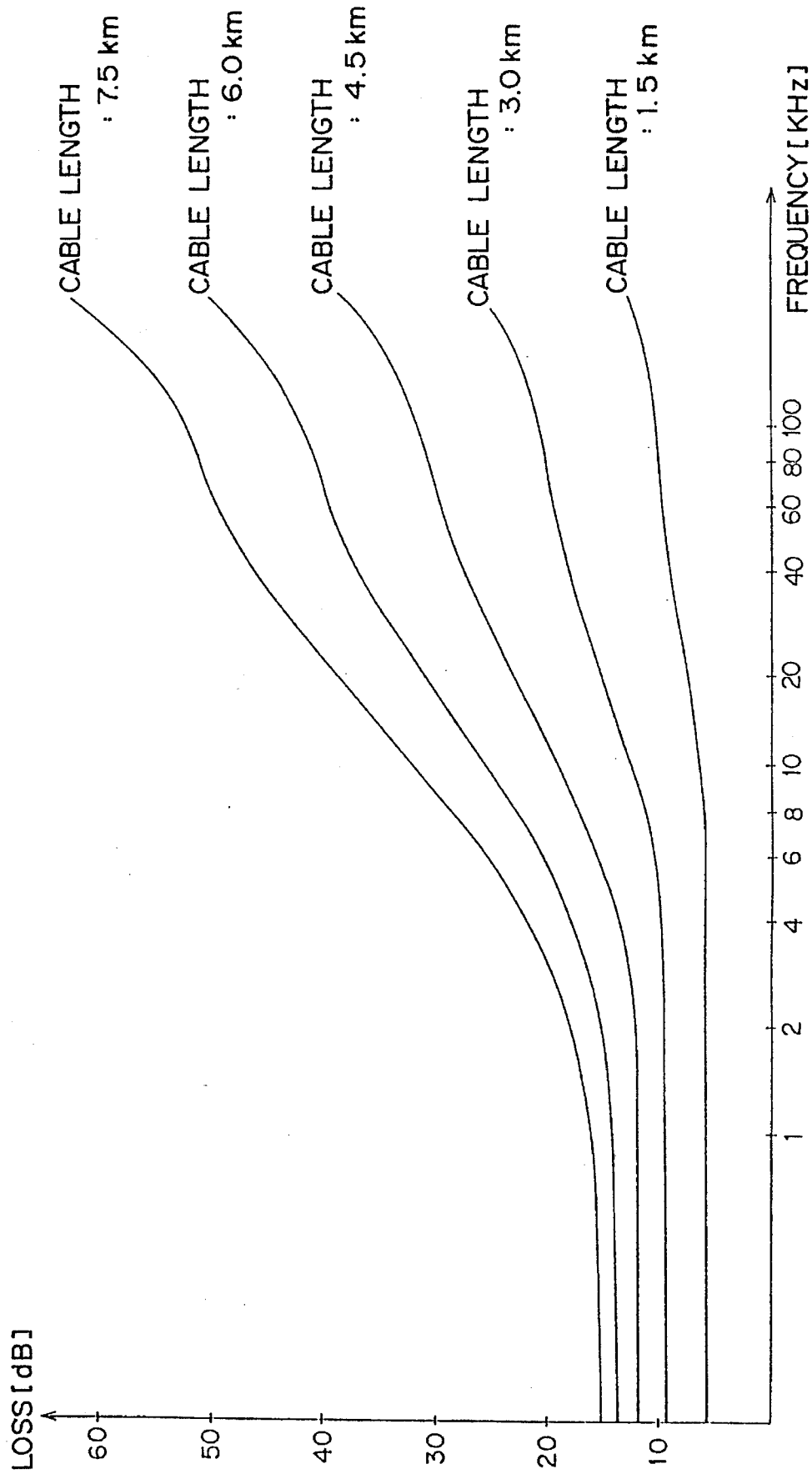
FIG. 1 is a graph of loss frequency characteristics of exemplary cables.
Figure 11:
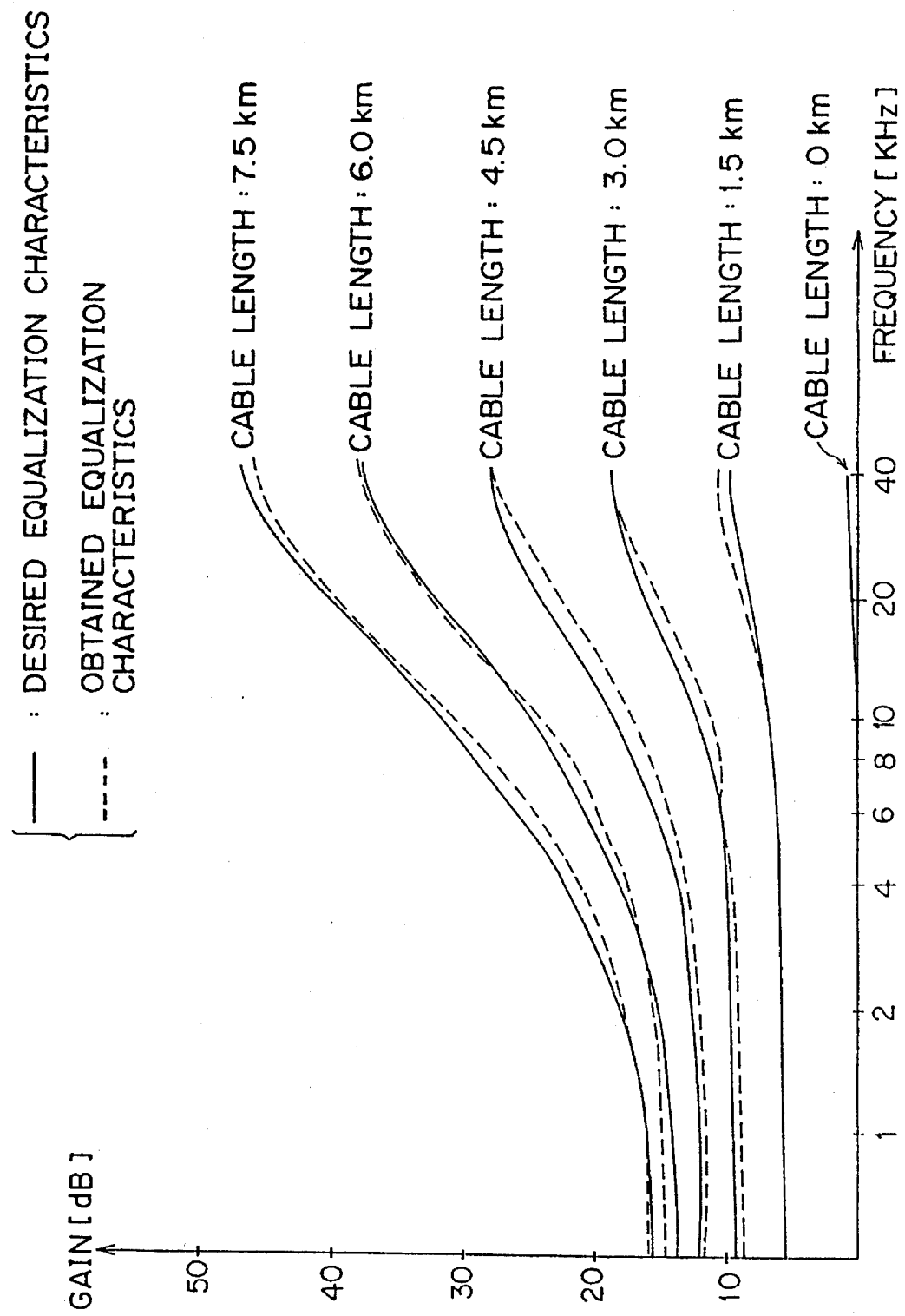
FIG. 11 is a graph of an example of equalization characteristics of the digital amplitude adaptive equalizer in the embodiment shown in FIG. 9.

Assuming that the equalization characteristics to be realized by the filter 202 have the transmission characteristics such as shown in FIG. 11 corresponding to the loss-frequency characteristics shown in FIG. 1, the gain in decibels is not proportional to the distance, and, especially, the loss in the low frequencies does not increase even through the distance increases. The filter coefficients $a_0$, $a_1$ and $a_2$ respectively obtained by transforming the one parameter x by the functions $f_0$, $f_1$ and $f_2$ in equation set (2) are used for realizing such characteristics, according to the following considerations.

The respective functions $f_0$, $f_1$ and $f_2$ are obtained as follows. First, a considerable number of objective characteristics curves using, e.g. cable lengths as the parameter, and filters are designed with their orders fixed, so that their filtering coefficients are obtained. Here, the considerable number large means a number enough for properly obtaining the functions $f_0$, $f_1$ and $f_2$, as described later. Now, the filtering coefficients $a_0$, $a_1$ and $a_2$ of the three-tap transversal filter corresponding to the equalization characteristics for the respective cable lengths of the six kinds shown in FIG. 3 and used in equation (1) are obtained e.g. by using approximation programs for designing digital equalizers. The filtering coefficients $a_{0i}$, $a_{1i}$ and $a_{2i}$ ($1 \leq i \leq 6$) are assumed to have the following relations.

$a_{01}$, $a_{11}$ and $a_{21}$ are for 0.0 km.

$a_{02}$, $a_{12}$ and $a_{22}$ are for 1.5 km.

$a_{03}$, $a_{13}$ and $a_{23}$ are for 3.0 km.

$a_{04}$, $a_{14}$ and $a_{24}$ are for 4.5 km.

$a_{05}$, $a_{15}$ and $a_{25}$ are for 6.0 km.

$a_{06}$, $a_{16}$ and $a_{26}$ are for 7.5 km.

Next, by setting x as a distance the following equation is defined.

$$a_0 = f_0(x) = a + bx + cx^2 + dx^3 + ex^4 \quad (3)$$

Figure 3:
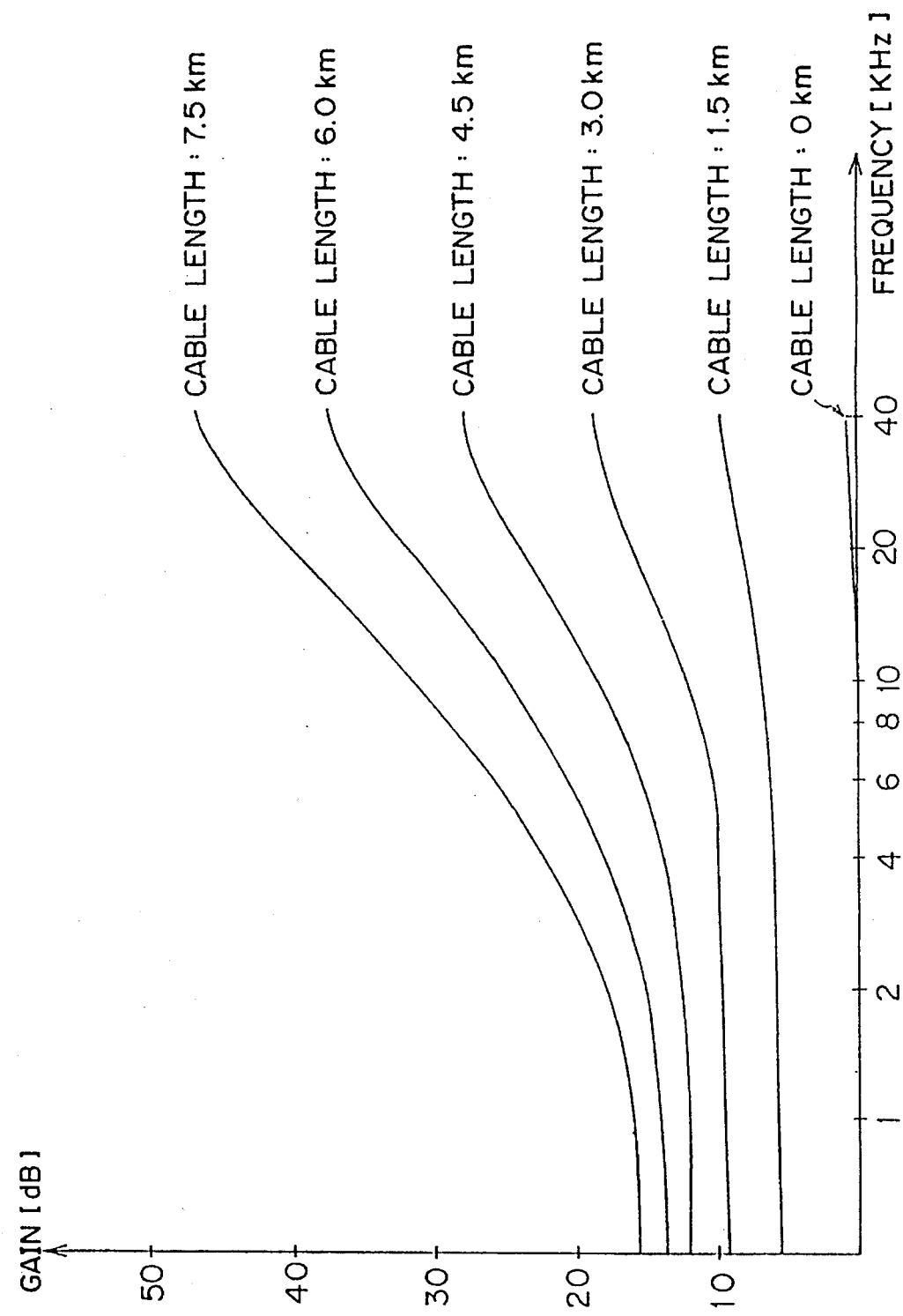
FIG. 3 is a graph of an example of equalization characteristics.

By setting the respective cable lengths shown in FIG. 3 as $x_i$ ($1 \leq i \leq 6$), coefficients a, b, c, d, e and f in equation (3) are obtained from the following equation set.

$$a_{01} \approxeq f_0(x_1)$$
$$a_{02} \approxeq f_0(x_2)$$
$$a_{03} \approxeq f_0(x_3)$$
$$a_{04} \approxeq f_0(x_4)$$
$$a_{05} \approxeq f_0(x_5)$$
$$a_{06} \approxeq f_0(x_6) \quad (4)$$

The number of necessary equations can be larger than the number of coefficients, and coefficients a, b, c, d, e and f are obtained, if equation set (4) is almost satisfied. The method of least squares is sufficient as the obtaining method.

The coefficients for functions $f_1$ and $f_2$ in equation (2) are obtained in a similar manner as above described equations (3) and (4). What should be noted here is that the larger the error is, the simpler the form of the function of equation (3) is, thereby meaning that the characteristics expressed in equation (3) can be way off from the actually calculated curve at some intermediate points, even if the obtained approximation function is good at certain points such as $x_1$ through $x_6$. On the other hand, when the number of terms in function (3) is increased, a problem arises that the processing volume for obtaining actual filtering coefficients $a_0$, $a_1$ and $a_2$ from parameter x is increased. Hence, the best number of terms in equation (3) needs to be obtained on a cut-and-try method. The cut-and-try method is explained as follows. The function type is defined as the equation (3) and has only a term of a constant number at an initial stage.

Then, coefficients of the function can be obtained by the minimum square method. Next, the errors of respective frequencies are obtained regarding the representative curves (for example, 0 to 7.5 km, 1.5 km steps ). When the error is not small, the number of terms, namely, the order is increased. When the number of terms is raised sufficiently, the functions $f_0$, $f_1$ and $f_2$ with continuously variable characteristics are necessarily obtained.

The actually obtained results of the respective functions $f_0$, $f_1$ and $f_2$ in equation set (2) for obtaining filtering coefficients $a_0$, $a_1$ and $a_2$ in equation (1) corresponding to the equalization characteristics of the respective cable lengths of the six types shown in FIG. 3 are as follows.

$$a_0 = f_0(x) = 1 + 9.8 \cdot x + 69.6 \cdot x^2 + 292.2 \cdot x^3$$

$$a_1 = f_1(x) = -2 \cdot x(1 + 9.8 \cdot x + 69.6 \cdot x^2 + 292.2 \cdot x^3)$$

$$a_2 = f_2(x) = x(1 + 9.8 \cdot x + 69.6 \cdot x^2 + 292.2 \cdot x^3) \quad (5)$$

where x herein denotes the actual cable length measured in kilometers multiplied by 0.093.

Figure 4:
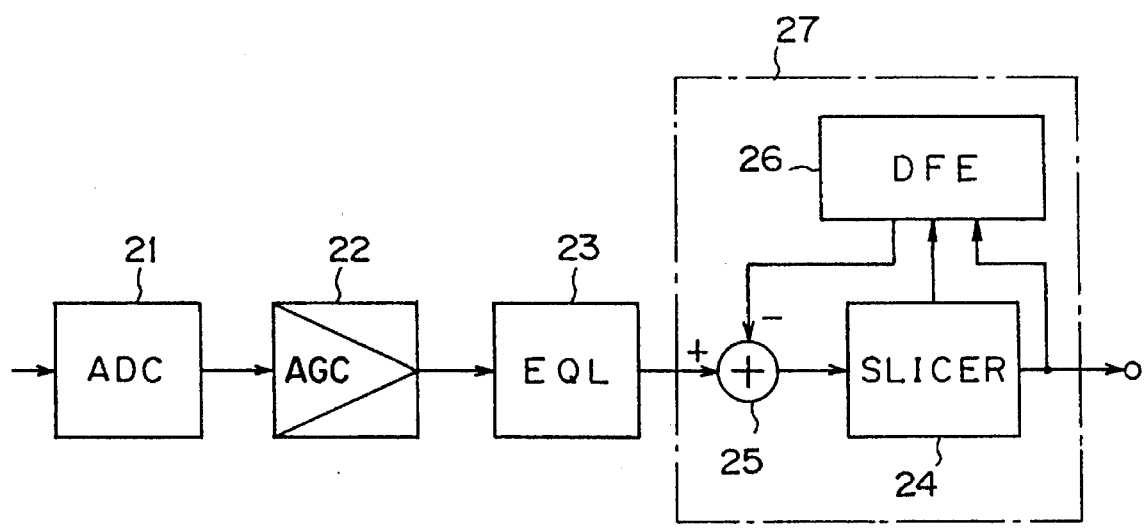
FIG. 4 is a block diagram of a line equalizer.
Figure 5:
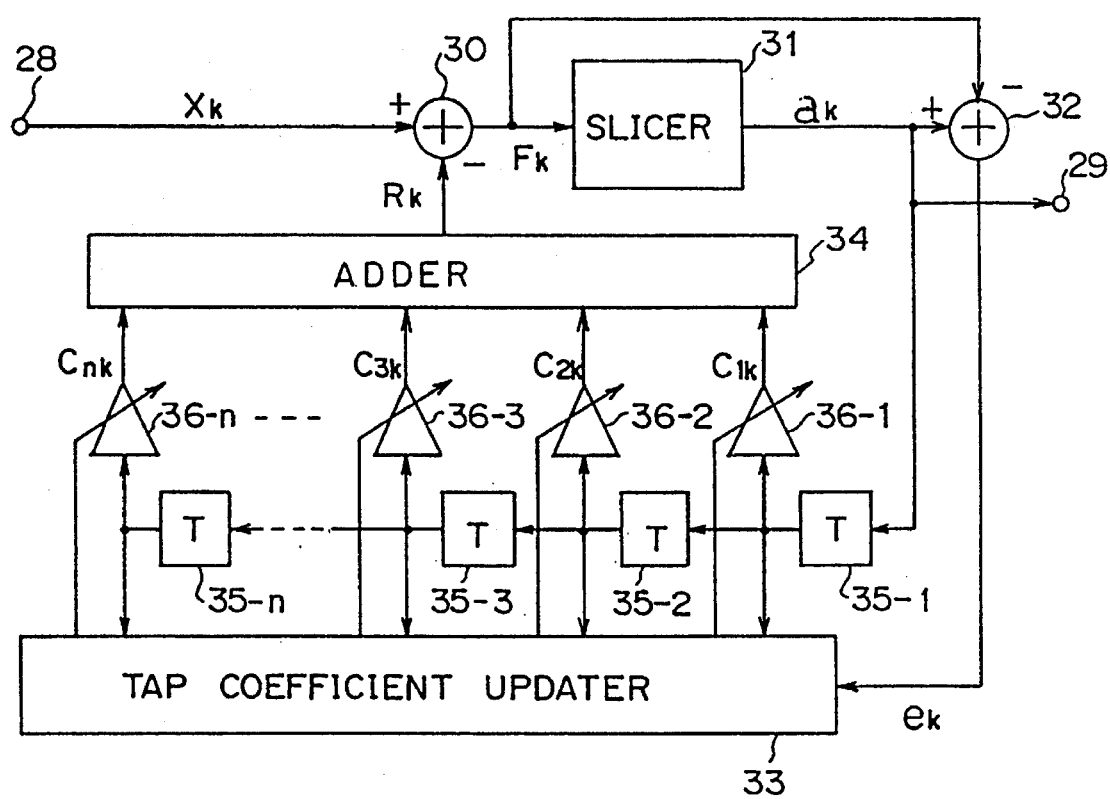
FIG. 5 is a block diagram of a conventional decision feedback equalizer.
Figure 6:
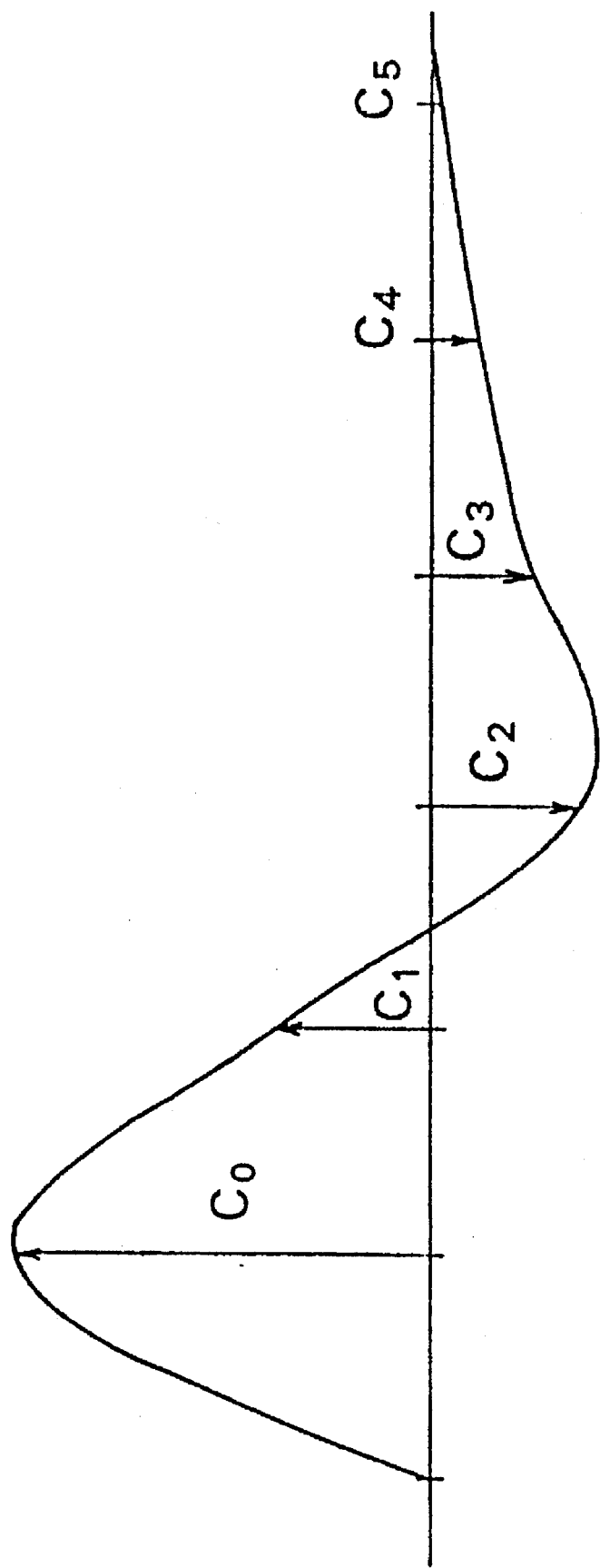
FIG. 6 is a graph of the relationship between a reception signal impulse pulse response and tap coefficients.

The filter transmission characteristics expressed as equation (1) using the filtering coefficient expressed as equation (5) described above are as shown as the dashed lines in FIG. 11, which shows that the obtained transmission characteristics closely match the rated equalization characteristics shown as solid lines in FIG. 11 having the same ratings as the equalization characteristics shown in FIG. 4.

Accordingly, the functions such as those expressed by equation set (5) are set in the respective coefficient calculator 307, 308 and 309 in the coefficient transformer 203 shown in FIG. 10 and the operations of equation set (2) are performed with x used as the parameter, thereby enabling the filter 202 shown in FIG. 10 to realize the desired equalizations.

Here, the parameter updater 310 generates parameter x based on the coefficient updating information 204 from the decision feedback equalizer 9 shown in FIG. 9, which is described later.

As to a representative example of an intermediate curve, coefficients of the transformation equations (3) and (4) are obtained by using the minimum square method so that the characteristics of the equalizer can follow the representative example of the intermediate curve. When the difference between representative curves is not large, good approximation can be achieved regarding the intermediate curve by changing the parameters.

Figure 12:
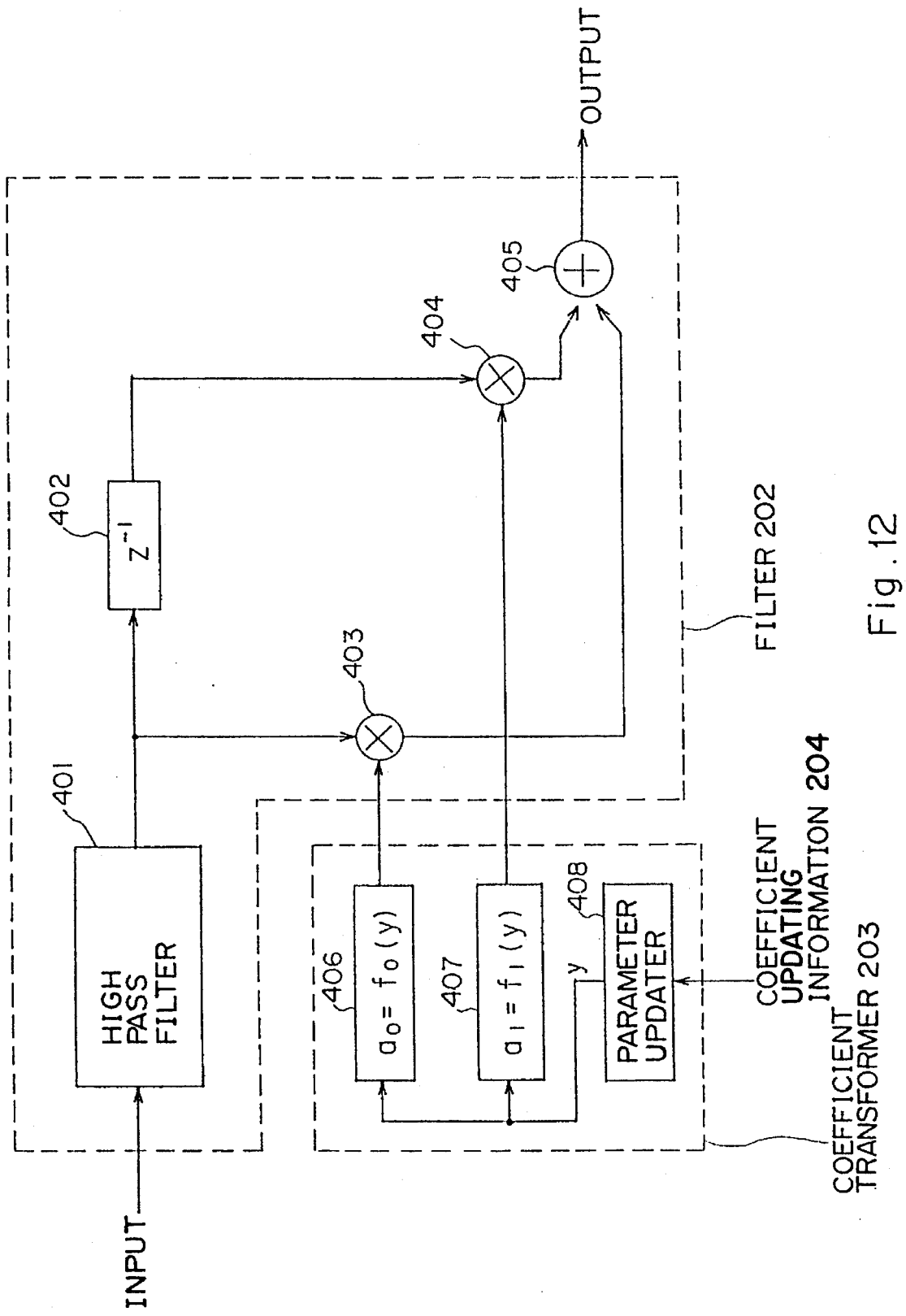
FIG. 12 is a block diagram of an embodiment of a digital amplitude adaptive equalizer according to the present invention.

FIG. 12 shows a configuration of another embodiment of the digital amplitude adaptive equalizer 201 shown in FIG. 9.

The embodiment of this invention shown in FIG. 12 has such a configuration that the preceding stage of the filter 202 has a high pass filter 401 with fixed characteristics realizing high pass characteristics with about 10dB more gains at 80 kHz frequency compared with the gain at 0 Hz frequency and that the succeeding stage of the filter 202 has a two-tap one-order transversal filter comprising a lag element 402 for lagging outputs from the high pass filter 401 by one whole sampling period, a multiplier 403 for multiplying the outputs from the high pass filter 401 by filtering coefficient $a_0$, a multiplier 404 for multiplying the outputs from the lag element 402 by filtering coefficient $a_1$, and an adder 405 for adding the respective outputs from the multipliers 403 and 405, thereby outputting the sum as the filter output. The coefficient transformer 203 is configured by coefficient calculators 406 and 407 and a parameter updater 408.

As with the embodiment illustrated in FIG. 10, the actually obtained results of the respective functions $f_0$ and $f_1$ for obtaining filtering coefficients $a_0$ and $a_1$ corresponding to the equalization characteristics of the respective cable lengths of the six types shown in FIG. 10 are as follows.

$$a_0 = f_0(x) = 1.75 e^{3.22y}$$

$$a_1 = f_1(x) = -1.75 y e^{3.22y} \quad (6)$$

where x herein denotes the actual cable length measured in kilometers and y is defined as:

$$y = 0.1867 \cdot x - 0.45 \quad (7)$$

The transfer characteristics synthesized from both the filter transfer characteristics in the filter 202 shown in FIG. 12 using filtering coefficients $a_0$ and $a_1$ expressed as equations (6) and (7) described above and the fixed transfer characteristics of the high pass filter 401 do not strictly match the transfer characteristics expressed as equation set (5) in the first embodiment described earlier and do have some differences in some frequency bands.

However, the processings of the digital amplitude adaptive equalizer 201 of the digital subscriber line transmission interface device shown in FIG. 8 aims at reproducing the original pulse response waveforms with little intersymbol interference from a solitary pulse waveform response made smaller, blunter and flatter because of the high frequency cutoff characteristics and loss in the analog pair cable 2. Consequently, they don't necessarily have to strictly match in all frequency bands.

Here, in using equations (6) and (7), when the cable length changes from 0 to 7.5 km (corresponding to FIG. 9), since the parameter y changes linearly from −0.45 to 0.95, it is evidently permissible to use y, in lieu of x, as the parameter for coefficients $a_0$ and $a_1$. Yet, since equation set (6) involves calculation by a exponential function, there needs to be more contrivance in obtaining filtering coefficients from the parameter y for coefficients $a_0$ and $a_1$ than what is necessary in using equation set (5). In the actual processes by the digital signal processing LSI (DSP), as described later, it is effective to segment the values of the parameter y and to find the respective coefficients assuming that the coefficients change linearly in the respective value segments.

As a result, by setting the functions expressed as equation set (6) in the respective coefficient calculators 406 and 407 in the coefficient transformer 203 shown in FIG. 12 and by obtaining filtering coefficients $a_0$ and $a_1$ using y as the parameter, the filter 202 shown also in FIG. 12 realizes sufficiently practical equalizations.

In the embodiment shown in FIG. 10 or the embodiment shown in FIG. 12 described earlier, the parameter updater 310 (FIG. 10 ) or 408 (FIG. 12) generates the parameter x or y, which is the input to the coefficient calculators 307, 308 and 309 (FIG. 10) or 406 and 407 (FIG. 12) of the coefficient transformer 203, based on the coefficient updating correction information 204 from the decision feedback equalizer 9 shown in FIG. 9. The generating processes are described below.

It is apparent from equations (5) and (6) desired characteristics are obtained by inputting the value x or y corresponding to the cable length, when the parameter values are controlled manually from the outside. Yet, a digital subscriber line transmission interface device such as shown in FIG. 10 is requested to automatically realize optimal equalization characteristics during a training period.

This embodiment uses the same method as that for optimizing the tap coefficients for the echo canceler 15 or the decision feedback equalizer 9 inserted immediately before or after the digital amplitude adaptive equalizer 201. That is, by setting $x_k$ as the value of x (or y) at time k, the following equation for updating sequentially optimizes the value of x (or y), where sign($a_k$) and sign($e_k$) respectively denote the polarities of the decision symbol $a_k$ and error $e_k$ of the decision feedback equalizer 9.

$$x_{k+1}=x_k-\alpha \cdot \text{sign}(a_k) \cdot \text{sign}(e_k) \qquad (8)$$

Here, $\alpha$ is a small positive number. Techniques for optimizing equalizers are disclosed e.g. in pages 224 through 250 of the "digital signal processing" compiled by the IEICE (Institute of Electronics, Information and Communication Engineers).

Now, if the equalizer is set at the optimum level, the average value of sign($a_k$)·sign($e_k$) in equation (8) is 0. The average value 0 means that number of times being positive is approximately equal to that being negative at a level of several hundred times, although the equalizer has positive or negative values in individual cases. When the digital amplitude adaptive equalizer 201 has an insufficient gain, the number of times being negative is greater than the number of times being positive on the average, and x or y increases. When the optimum value is reached, the number of times being positive becomes approximately equal to that being negative, and x or y stays around that value.

Although strictly speaking, the parameter correction algorithm expressed as equation (8) becomes more complex per equation set (5) or (6), as shown in FIG. 11, either equation (8) or the equation in which the negative sign of equation (8) is corrected to the positive sign, as a linear approximation in the ranges where characteristics increase or decrease monotically in response to the changes, e.g., in x (corresponding to the cable length) produces a good result.

Figure 13:
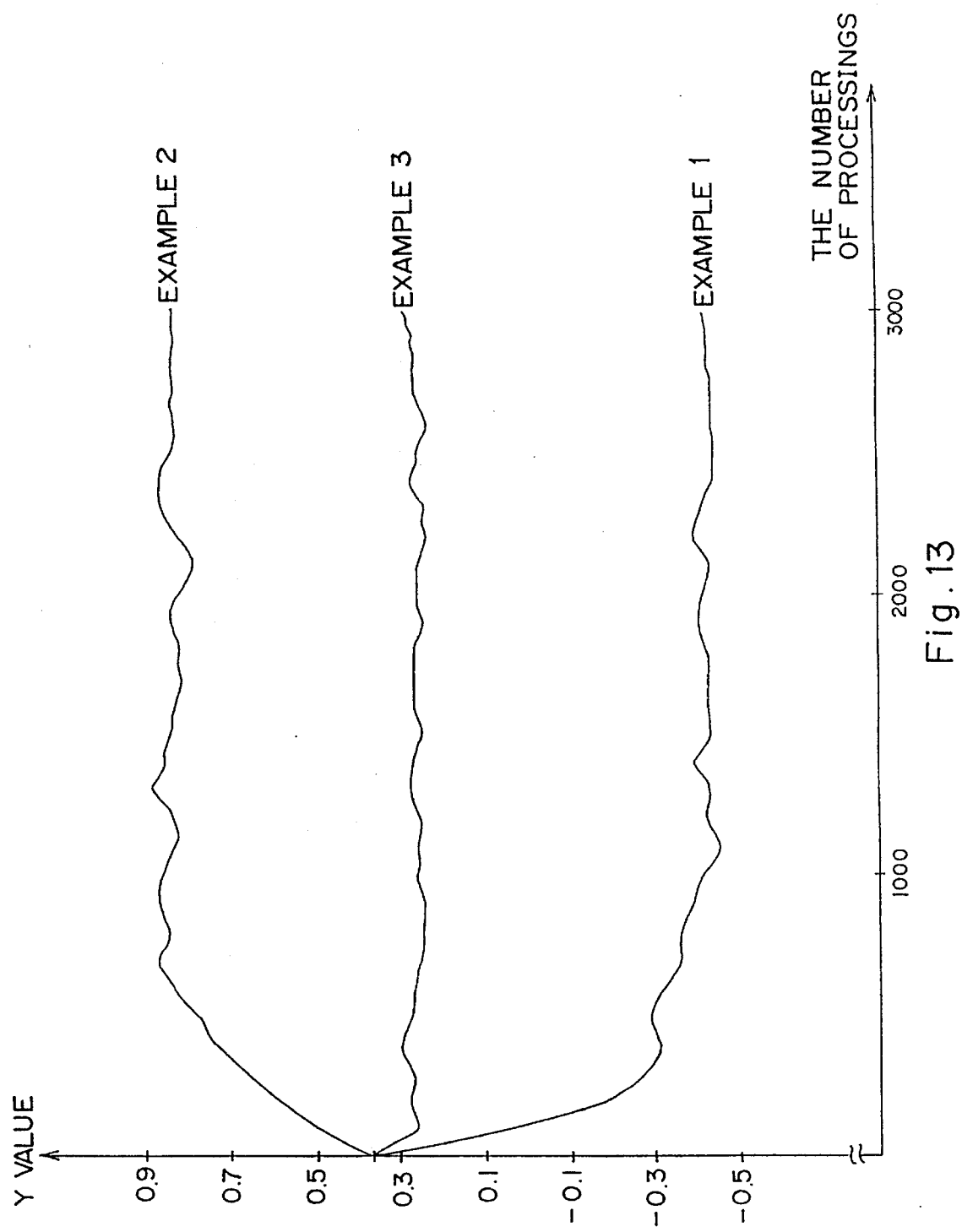
FIG. 13 is a graph of exemplary convergence of the parameter y.

FIG. 13 shows exemplary results of computer simulations for measuring the time for converging the value y, when the cable lengths are changed to three ways in the system of the embodiment shown in FIG. 11 with the initial value, set at 0.37. As illustrated in FIG. 13, the value y converges approximately by the processings of about 600 to 1000 times.

In this case, although the converging speed changes according to the initial value, since the decision feedback equalizer 9 operates simultaneously, the examples shown in FIG. 13 use the same initial value for the three cases of cable lengths. Upon receiving the error and decision symbols which are output results from the decision feedback equalizer 9 [For instance, the decision symbols for a digital subscriber line transmission interface device in North American specification are four (4) values of +3, +1, −1 and −3.], the parameter updater 310 (FIG. 9) or 408 (FIG. 12) in the coefficient transformer 203 sequentially updates the value x or y per equation (8) or a similar equation. By repeating the processes comprising inputting the updated value x or y into the coefficient calculators 307, 308 and 309 (FIG. 9) or 406 and 407 (FIG. 12), calculating the filtering coefficients per equation set (5) or (6), and having the filter 202 with the filtering coefficient filter the next digital reception signals, the value x or y is destined for the optimum value.

For the operation expressed as equation (8), a decision feedback equalizer performs the operations, the number of which being equal to the filtering order m of the decision feedback equalizer, expressed by the following equation:

$$C_{i,k}(9)=C_{i,k}-\alpha \cdot \text{sign}(a_{k-i}) \cdot \text{sign}(e_k)$$

where:

$C_{1,k}$ is the i-th tap coefficient value of the filter in the decision feedback equalizer at time k;

i=1, 2, . . . , m m is the filtering order of the decision feedback equalizer;

$a_{k-i}$ is the decision symbol at time (k−i); and $\alpha$ is a very small value. A comparison of equation (8) with equation (9) reveals that the former corresponds to the case where i=0 in equation (9). Thus, the operation of equation (8) corresponds to the tap coefficient of the zero-th filter.

$$x_{k+1}=x_k-\alpha \cdot \text{sign}(a_k) \cdot \text{sign}(e_k) \qquad (8)$$

Figure 14:
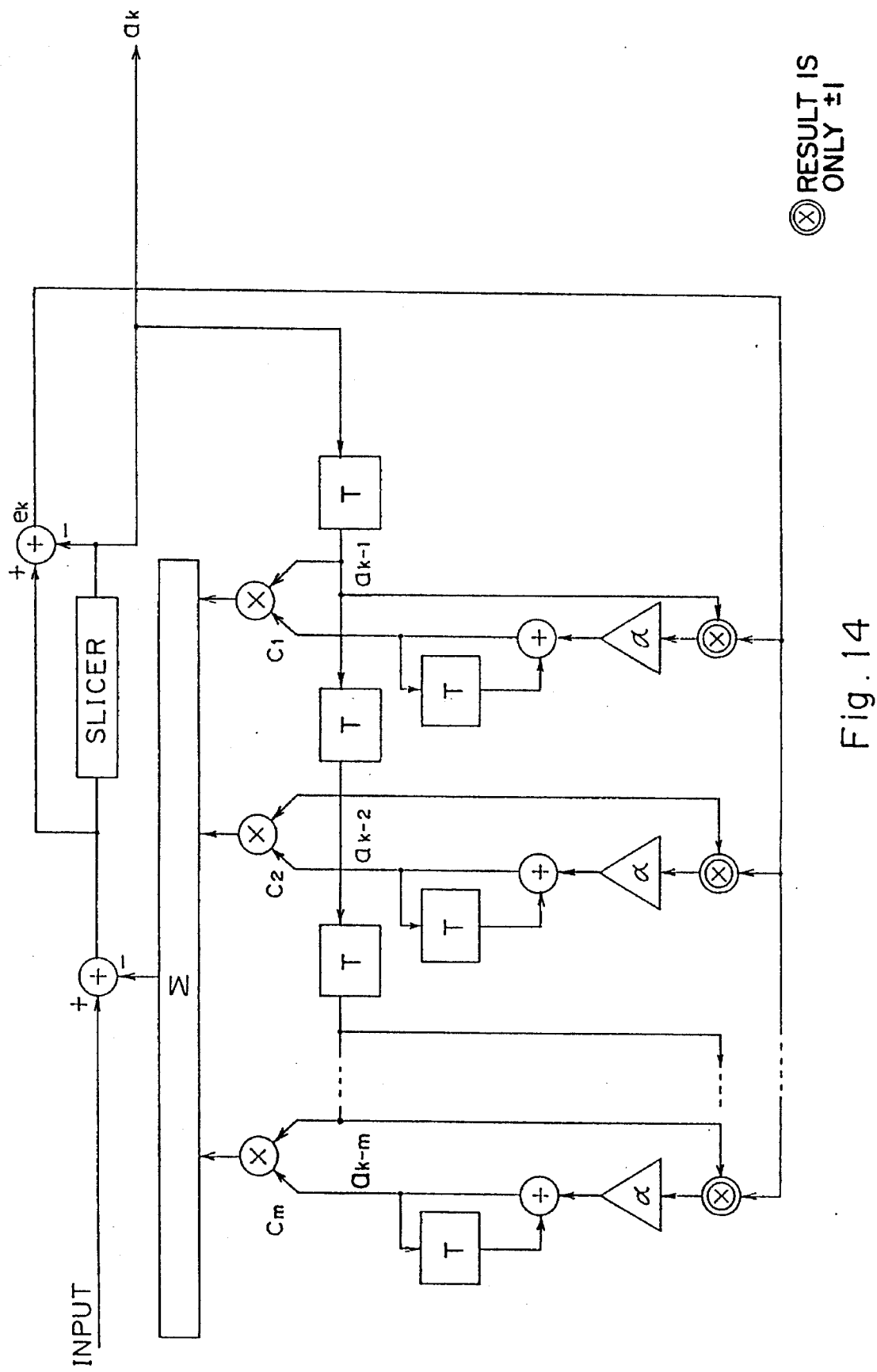
FIG. 14 is a block diagram of an example of a conventional decision feedback equalizer.
Figure 15:
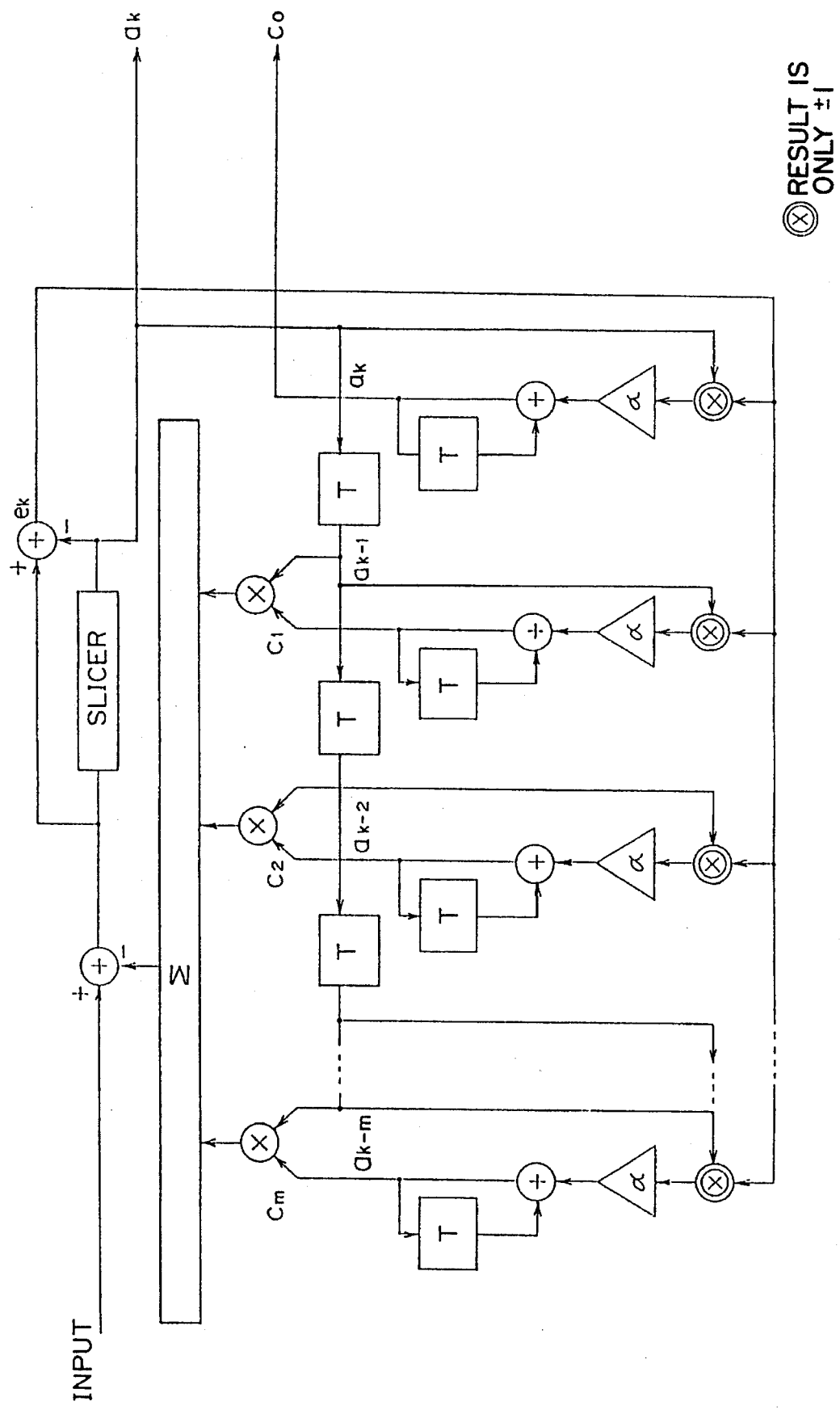
FIG. 15 is a block diagram of an embodiment of a decision feedback equalizer built in with a parameter updating means for an adaptive equalizer.

Because of the similarity between equation (8) and equation (9), it is easy to build the processing by equation (8) in the decision feedback equalizer, in which case the parameter updating means 109 shown in FIG. 8, the parameter updater 310 shown in FIG. 10 and the parameter updater 408 shown in FIG. 12 all become unnecessary. FIG. 14 shows an example of a conventional decision feedback equalizer, and FIG. 15 shows an embodiment of a decision feedback equalizer including parameter updating means according to this invention. A comparison between FIG. 14 and FIG. 15 reveals that the parameter updating according to this invention can be realized by increasing only one processing step of the decision feedback equalizer.

In the above embodiment, since the coefficient transformer 203 needs to process coefficient correction, it becomes necessary to determine a, b, c, d and e in equation (3), so that the functions expressed in equation set (2) have the least number of terms and the lowest order. To reduce the processing volume necessary for correcting coefficients, it is effective to build a conversion table in a ROM not specifically shown in the drawings, e.g. when the order is increased to more than a certain level. When such a ROM is employed, the ROM stores the linearly approximated characteristics of the respective functions in equation set (2) in a polygonal graph form, as described in the case of equation (6). Then, a process comprising two multiplications produces coefficients, in which the values at the kinked points, i.e. at both ends of the linearly approximated section in correspondence, are read for interpolation.

Although this causes more or less delay in convergence, it is possible to divide the coefficient calculations by the coefficient calculators 307, 308 and 309 (FIG. 10) or 406 and 407 (FIG. 12), so that only 1/n($\geq$2) coefficients are corrected. In this case, although different x values produce the respective filtering coefficients, since $\alpha$ is a very small value and x changes only by 1/1000 the per cycle, a mismatch by a cycle or two can only change the values x or y by the maximum of about 2/1000th, hardly causing a problem.

Also, as shown in the following, it is conceivable per equation set (5) to use the result of calculating filtering coefficient $a_0$ in calculating $a_1$ and $a_2$, thereby reducing the processing volume.

$$a_0=1+9.8x+69.6x^2+292.2x^3$$

$$a_2=xa_0$$

$$a_1=-2a_2$$

Since this invention enables a change in one kind of parameters to continuously determine the filtering coefficients, i.e., the transmission characteristics, for a filtering operation executing unit, the necessary equalization characteristics are uniquely determined, thereby minimizing the signal error rate.

When the digital adaptive equalizer has such a configuration that its succeeding stage is connected to a decision feedback equalizer, by having a parameter updater sequentially converge the value of the one kind of the parameters to the optimum, based on a decision symbol and an output error outputted from the decision feedback equalizer, this invention realizes a fast and securely converging digital adaptive equalizer, which reduces the processing amount and therefore the physical dimensions of the hardware.

Especially, since the associated filtering coefficients are updated concurrently with the changes in the one kind of the parameters, this invention realizes a converging speed far faster than that of a prior art device which independently updates the respective filtering coefficients.

Besides, processes are simplified and digital signals are easily processed, because the process for determining the filtering coefficients does not require a calculation of the sum of the squares but instead uses the same algorithm as that for the coefficient correction by the decision feedback equalizer, unlike any prior art device.

Figure 16:
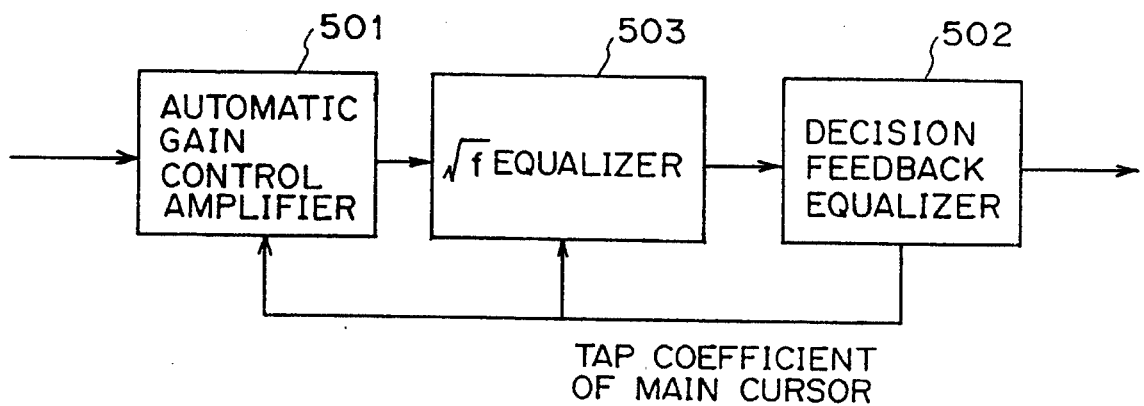
FIG. 16 is a block diagram illustrating the principle of a further embodiment of the present invention invention.

FIG. 16 is a block diagram designating an embodiment of the present invention. A line equalizer of a line equalizer according to this embodiment uses tap coefficients of the main cursor of the decision feedback equalizer. This embodiment configures a line equalizer equipped with an automatic gain control amplifier 501 preceding a decision feedback equalizer 502, wherein: the decision feedback equalizer 502 forms tap coefficients of a main cursor together with tap coefficients of a post cursor; and the automatic gain control amplifier 501 receives, as gain control signals, tap coefficients of the main cursor.

Alternatively, this invention configures a line equalizer equipped with $\sqrt{f}$ equalizer 503 preceding a decision feedback equalizer 502, wherein: the decision feedback equalizer 502 forms tap coefficients of a main cursor together with tap coefficients of a post cursor; and the $\sqrt{f}$ equalizer 503 receives, as control signals, the tap coefficients of the main cursor.

A decision feedback equalizer 502 for use in a line equalizer uses tap coefficients of a post cursor for eliminating the intersymbol interference components on the trailing edges of solitary pulse responses. The decision feedback equalizer 502 also forms tap coefficients of a main cursor. Since the tap coefficient value of the main cursor indicates the reception signal levels, by making it correspond to a gain control signal for the automatic gain control amplifier 501 in the preceding stage of the decision feedback equalizer 502, the automatic gain control amplifier 501 can amplify the reception signal to desired levels. Then, the decision feedback equalizer 502 eliminates the inter-symbol interference.

Also, by making the tap coefficient of the main cursor of the decision feedback equalizer 502 correspond to coefficient controls signals, and by controlling a coefficient updater configuring, e.g., a digital filter of a $\sqrt{f}$ equalizer, frequency characteristics can be changed. That is, a control can be performed such that the changes in line characteristics can be compensated.

Figure 17:
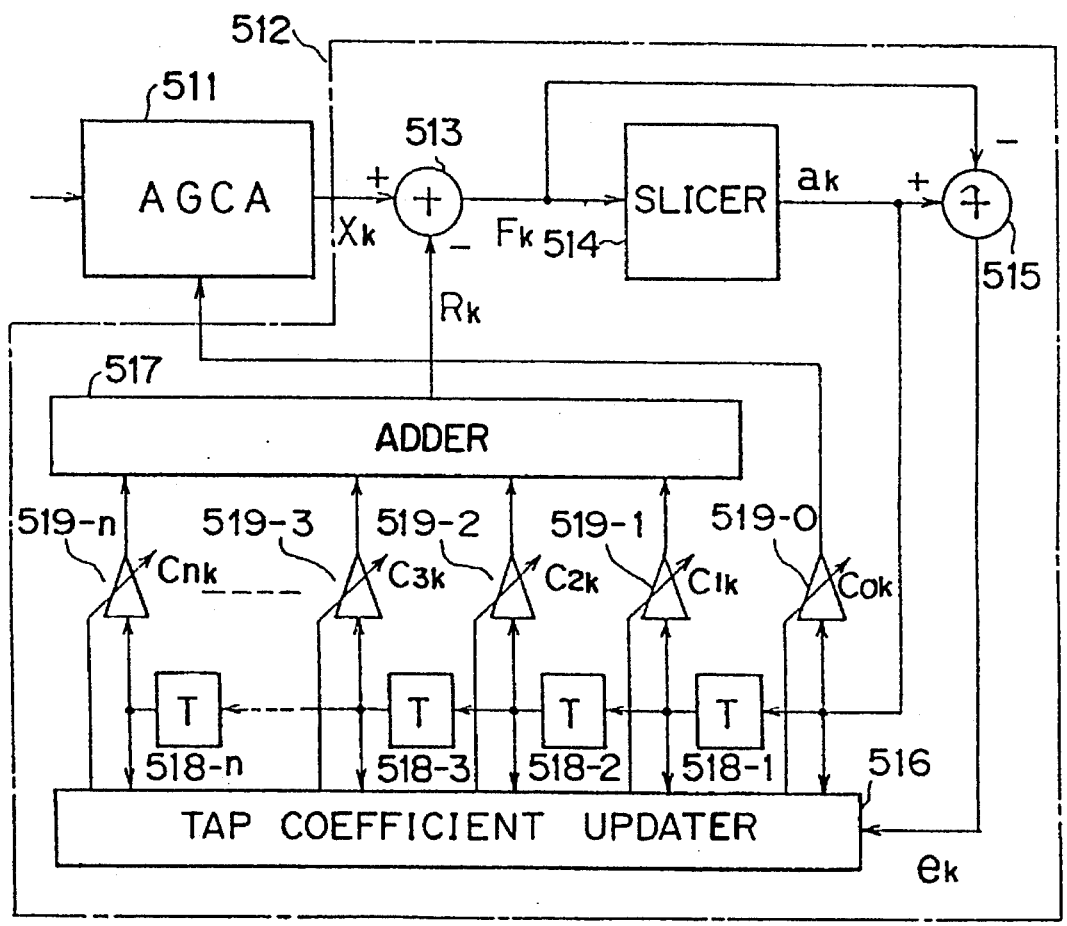
FIG. 17 is a block diagram of an embodiment of this invention.

FIG. 17 is a block diagram of an embodiment of this invention, where 512 denotes a decision feedback equalizer, 511 denotes an automatic gain control amplifier (AGCA), 513 denotes an adder, 514 denotes a slicer (DEC), 515 denotes an adder, 516 denotes a tap coefficient updater, 517 denotes an adder, 518-1 through 518-n denote lag elements (T), and 519-0 through 519-n denote coefficient multipliers.

This embodiment shows a line equalizer equipped with an automatic gain control amplifier 511 preceding a decision feedback equalizer 512. The decision feedback equalizer 512 has an adder 513 to eliminate intersymbol interference components $R_k$ from the reception signals $X_k$ at time k. A decision making module 514 makes a decision on equalized signals $F_k$. The adder 515 calculates the error signal $e_k$, which is the differences between the decision output signal $a_k$ and the equalization signal $F_k$. A tap coefficient updater 516 receives the error signal $e_k$. Lag elements 518-1 through 518-n sequentially lag the decision output signal $a_k$ by one baud rate period, which the tap coefficient updater 516 also receives, thereby controlling the coefficients supplied to coefficient multipliers 519-0 through 519-n.

In this case, the coefficient multipliers 519-1 through 519-n controlled by the tap coefficient updater 516 multiply the tap coefficients $C_{1k}$ through $C_{nk}$ of the post cursor by the outputs from lag elements 518-1 through 518-n, which products are supplied to an adder 517, of which summing results are supplied to the adder 513 as the intersymbol interference components $R_k$. The automatic gain control amplifier 511 receives, as the gain control signals, the tap coefficients $C_{0k}$ of the main cursor from the coefficient multiplier 519-0 directly supplied with decision output signal $a_k$.

Figure 7:
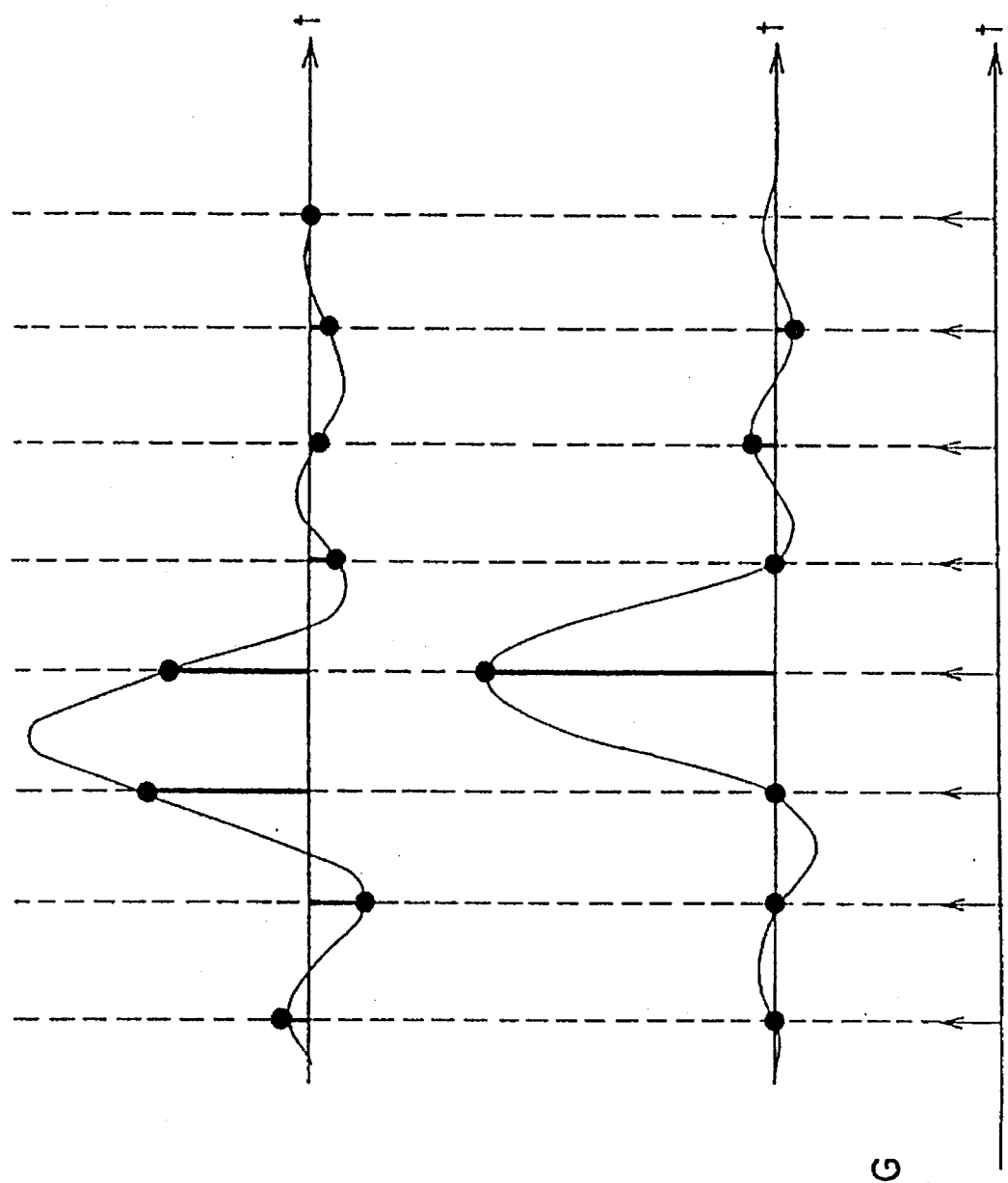
FIG. 7A to 7C is a graph illustrating timing adjustments by a lag circuit.

That is, although a conventional decision feedback equalizer does not require the tap coefficients of the main cursor for obtaining intercode interference components $R_k$, this invention adds the coefficient multiplier 519-0 to the configuration for forming the tap coefficients $C_{0k}$ of the main cursor. As is evident from the single pulse response waveform shown in FIGS. 7A to 7C, since the tap coefficients $C_{0k}$ of the main cursor indicates the pulse level at identification timings, only the gain of the automatic gain control amplifier 511 needs to be controlled, so that the tap coefficients $C_{0k}$ of the main cursor are at predetermined levels. Accordingly, because a configuration of the automatic gain control amplifier 511 can do without power operations of reception signals, it can be made economically.

Figure 18:
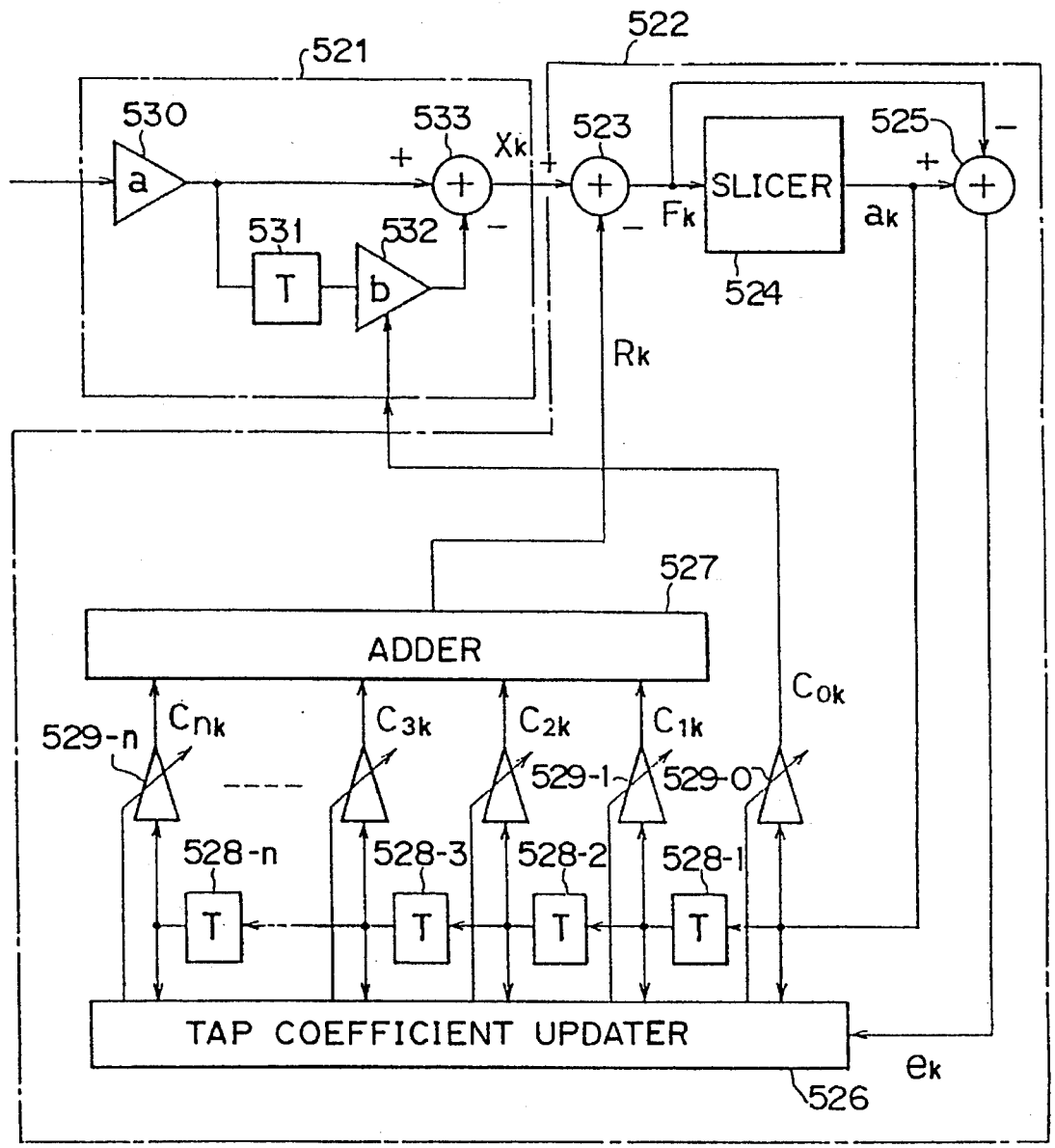
FIG. 18 is a block diagram of an embodiment of this invention.

FIG. 18 is a block diagram of another embodiment of this invention, where 522 denotes a decision feedback equalizer, 521 denotes a $\sqrt{f}$ equalizer, 523 denotes an adder, 524 denotes a slicer, 525 denotes an adder, 526 denotes a tap coefficient updater, 527 denotes an adder, 528-1 through 528-n denote lag elements (T), 529-0 through 529-n denote coefficient multipliers, 530 and 532 denote coefficient updaters, 531 denotes a lag element (T), and 533 denotes an adder.

This embodiment illustrates a line equalizer equipped with a $\sqrt{f}$ equalizer preceding stage of a decision feedback equalizer. As with the decision feedback equalizer 512, a decision feedback equalizer 522 has a slicer 524 decide on the equalization signal $F_k$ which is the input signal $X_k$ relieved of the intersymbol interference components $R_k$. The decision feedback equalizer 522 supplies to a tap coefficient updater 526 the error signal $e_k$ which is the difference between the decision output signal $a_k$ and the equalized signal $F_k$. The decision feedback equalizer 522 supplies the decision output signal $a_k$ to coefficient multipliers 529-1 through 529-n by having lag elements 528-1 through 528-n sequentially lag the decision output signal $a_k$ by one baud rate period, which is supplied to the coefficient multipliers 529-1 through 529-n, as well as to the tap coefficient updater 526. The tap coefficient updater 526 controls the coefficients in the coefficient multipliers 529-0 through 529-n. The products of multiplying the tap coefficients $C_{1k}$ through $C_{nk}$ of the post cursor by the outputs from the lag elements 528-1 through 528-n are supplied to the adder 527 to obtain the intersymbol interference components $R_k$. The coefficient multiplier 529-0 forms the tap coefficient $C_{0k}$ of the main cursor. The tap coefficient $C_{0k}$ is supplied, e.g., to a coefficient multiplier 532, as coefficient control signals of the $\sqrt{f}$ equalizer 521.

If the coefficients a and b respectively for the coefficient multipliers 530 and 532 are both set to 1, when $0 \leq \omega \cdot T \leq \pi$ is satisfied, the $\sqrt{f}$ equalizer 521 acts as a low pass filter. On the other hand, if the coefficients a and b respectively for the coefficient multipliers 530 and 532 are set to 1 and −1, when $0 \leq \omega \cdot T \leq \pi$ is satisfied, the $\sqrt{f}$ equalizer 521 acts as a high pass filter. Consequently, by controlling the coefficient b of the coefficient multiplier 532 according to the tap coefficient $C_{0k}$ of the main cursor, the characteristics of the $\sqrt{f}$ equalizer 521 can be controlled. The $\sqrt{f}$ equalizer can of course be configured differently. In such cases, by controlling the coefficients of the coefficient multipliers by the tap coefficient $C_{0k}$ of the main cursor, the equalization characteristics can be controlled.

As previously explained, this embodiment configures a line equalizer equipped with an automatic gain control amplifier 521 preceding a decision feedback equalizer 522 to be controlled by the tap coefficient of the main cursor of the decision feedback equalizer 522. A mere addition of one coefficient multiplier to a conventional decision feedback equalizer 502 produces a tap coefficient of the main cursor, which brings about an advantage that the configuration of the automatic gain control amplifier 501 is able to be simplified.

Alternatively, this embodiment configures a line equalizer equipped with a $\sqrt{}$ equalizer preceding a decision feedback equalizer to be controlled by the tap coefficients of the main cursor of the decision feedback equalizer. As with the above case, a mere addition of one (1) tap to a conventional decision feedback equalizer 502 enables the equalization coefficients of the $\sqrt{f}$ equalizer 503 to be controlled, which brings about an advantage that the configuration of the $\sqrt{f}$ equalizer can to be simplified.

Suppose that an input an AGC is provided by $G_k$, and the output is $Q_k$, and input to a line equalizer by $Q_k$, and an output by $X_k$, and they have the following relations:

$$Q_j = 2^m * G_j$$

$$X_j = \frac{1 - Z^{-1}}{1 - A * Z^{-1}} * Q_j$$

where m is changed with A and a combination of m and A is as follows, for example.

| m | 0 | 1 | 2 | 3 | 4 | 5 | 6 |
|---|---|---|---|---|---|---|---|
| A | 0.875 | 0.875 | 0.75 | 0.5 | 0.25 | 0.0 | 0.0 |

In the above equations, gain can be changed by m and frequency characteristics can be changed by A. When the decision feedback type equalizer is converged to perform a communication and the values of m and A are changed, the residue error of the decision feed back type equalizer increases, thereby causing an error in decision. Therefore, generally, an updating of the values of m and A is performed during an initial training and is made fixed during communication. The algorithm of the training is as follows.

m=0 and A=0.875 at an initial stage (k=0–10 L). A tap coefficient $C_{0,k}$ of a main cursor is referred to at every L sample in k=0 to 10 L and is updated in the following manner and is made fixed in k=10 L When $C_{0,k} > 1.5$, $m_{k+1} = m_k + 1$, A changes with M.

When $C_{0,k} < 0.5$, $m_{k+1} = m_k + 1$, A changes with M.

Figure 19:
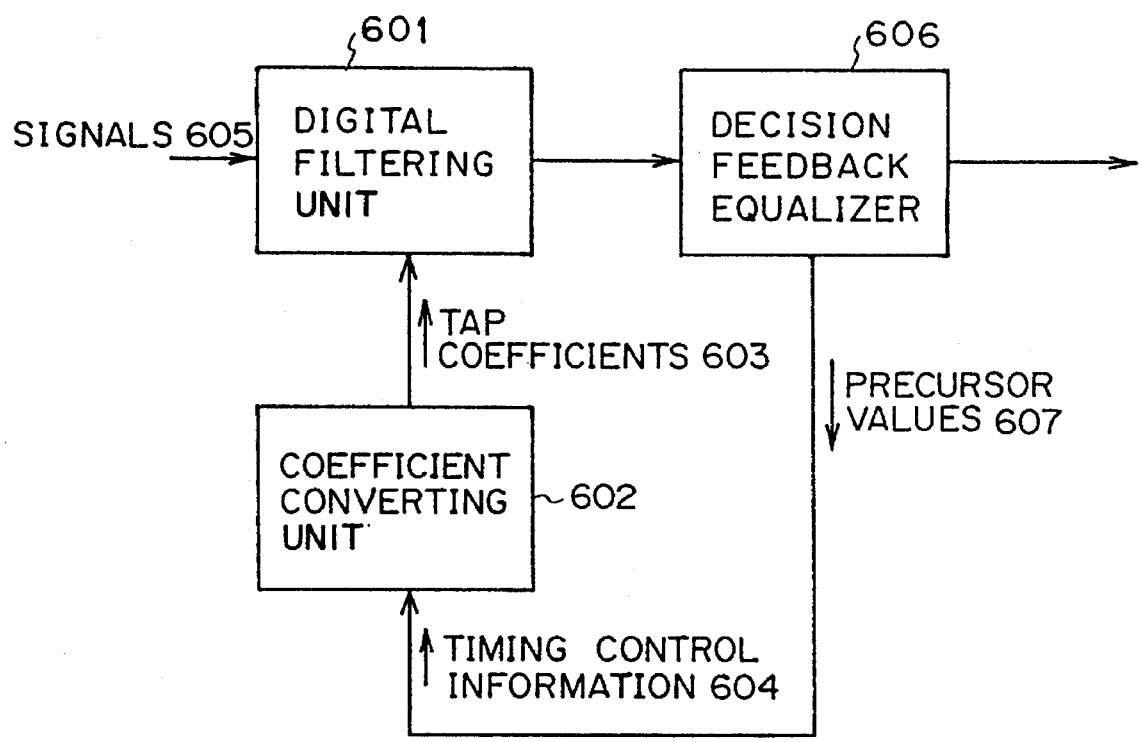
FIG. 19 is a block diagram illustrating a principle of a still further embodiment according to the present invention.

FIG. 19 is a block diagram of a principle of an embodiment based on a timing controller for adjusting the phase delay of signals transmitted through a filter. The timing controller is provided, e.g., in a digital subscriber line transmission interface for simultaneous emission and reception bi-directional communications by multi-value pulse signals, especially in a network side unit rather than a subscriber side unit.

As shown in FIG. 19, this embodiment uses a digital filtering unit 601 of the transversal type, being a variable group delay filter having a transfer function including a term for considering the waveform distortion, for adjusting the transmission phase delay of signals 605. The digital filtering unit 601 maybe configured by one or more stages of serially connected three-tap transversal type lag equalizers with tap coefficients of d and −d at the ends (where d is a real number) and a tap coefficient of 1 at the center. Alternatively, the digital filtering unit 601 may be configured by one or more stages of serially connected three-tap transversal type lag equalizer with two tap coefficients of d and −d at the ends (where d is a real number) and the tap coefficient of 1−$d^2$ at the center. Or it could even be a transversal type filter having the following transmission characteristics.

$$H(z^{-1}) = [a_k + b_k z^{-1} + (2-a_k)z^{-2}]^n [(2-a_j) + c_j z^{-1} + a_j z^{-2}]^m$$

where $z^{-1} = \exp(-j \cdot \omega \cdot T)$

T/2)=baud rate period $\omega$=angular frequency

2n+2m=filter order k=0, 1, 2, ..., n−1 j=0, 1, 2, ..., m−1

In this case, the values of tap coefficients $a_k$ for a part or all of n sections and the values of tap coefficients $a_j$ for a part or all of m sections can be different or the same value a. Here, the digital filter 601 acts at a speed producing more than two sample values per baud rate period of the signals 105.

Next, this embodiment comprises a coefficient transforming unit 602 calculating at least one piece of timing control information 604 by transforming all or part of tap coefficients 603. When a decision feedback equalizer 606 is connected to the later stage of the digital filtering unit 601, the timing control information 604 becomes a precursor value 607 in pulse response of the signals 605 obtained from the decision feedback equalizer 606. The coefficient transforming means 602 adaptively controls all or part of the tap coefficients 603 of the digital filtering unit 601.

The digital filtering unit 601, having a transfer function including a term for considering a waveform distortion, can change its lag characteristics without significantly affecting the loss characteristics by having the coefficient transforming unit 602 transform the tap coefficients 603, which enables the timings of the signals 605 to be easily adjusted.

Here, the coefficient transforming unit 602 calculates the tap coefficients 603 based on the timing control information 604 obtained from the other circuits. The timing control information 604 can be exactly the same as the tap coefficients 603 or can be signals instructing the filter either to increase or decrease the lags from the present level. If the timing control information 604 is exactly the same as the tap coefficients 603, the coefficient transforming means 602 calculates the values of the associated tap coefficients 603 other than the designated tap coefficients 603. When the timing control information 604 comprises only signals instructing an increase or reduction in the lags, the coefficient transforming unit 602 revises the tap coefficients, so that the lags change per the signals.

Here, when the decision feedback equalizer 606 is included, the precursor value 607 from the decision feedback equalizer 606 can be used as the timing control information 604, which enables the timings of the signals 605 to be optimized sequentially without having to establish a special circuit for generating the timing control information 604.

Although the coefficient transforming unit 602 does not have to revise the values of all tap coefficients 603 in the respective processing cycles, they operate per the timing control information 604 at least in every several cycles.

The following explains in detail embodiments of this invention.

Figure 20:
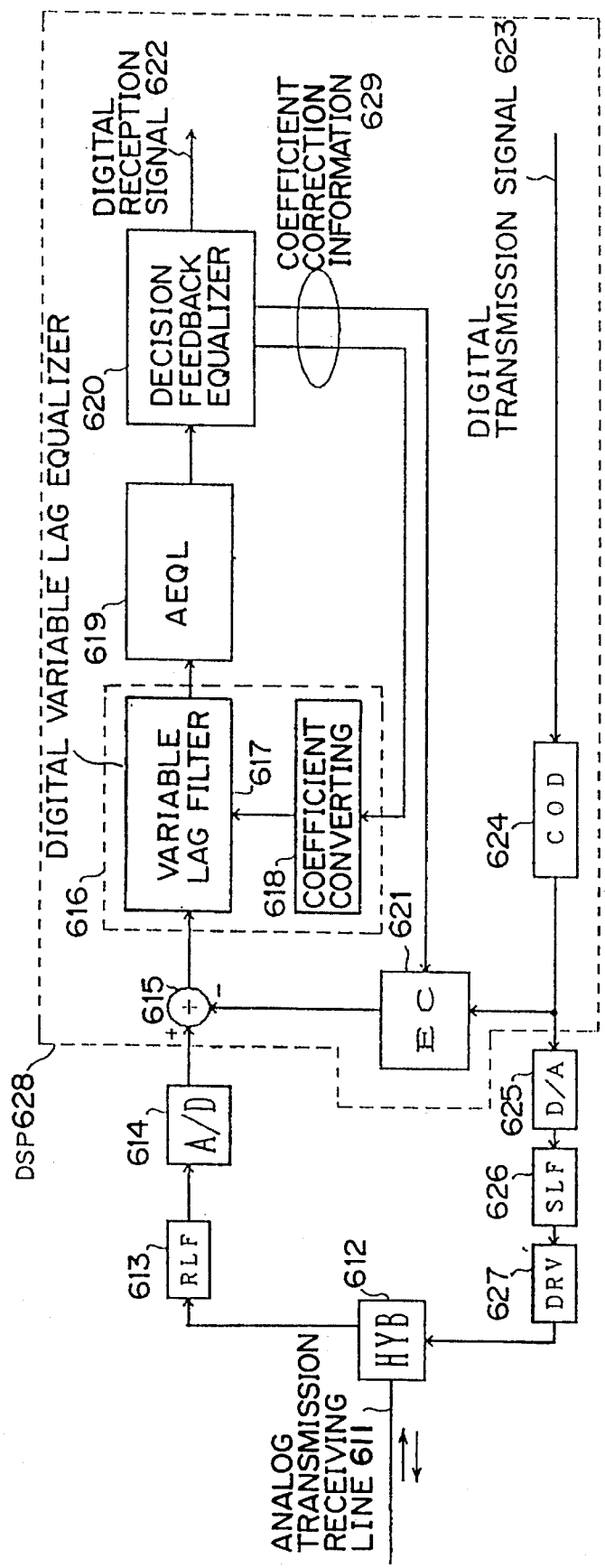
FIG. 20 is a block diagram of a timing adjustment circuit using a digital variable lag equalizer.

FIG. 20 is the block diagram of an embodiment of a digital subscriber line transmission interface unit per this invention.

After being separated by a hybrid transformer 612, and after being limited to have a band-width of half of the frequency band of the over-sampling frequencies by a reception side low pass filter (RLF) 613, the subscriber's signal is converted to a digital reception signal by an A/D converter 614 to be inputted to a DSP 628. The phase characteristics of the digital reception signal are equalized at the digital variable lag equalizer 616 configured by a filter 617 having a transfer function including a term for considering a waveform distortion, namely, a filter 617 with a variable delay and a coefficient converter 618, after passing through the subtracter 615. This part is particularly related to this invention. Further, an amplitude equalizer (A-EQL) 619 equalizes the output losses of the frequency amplitude characteristics because of the changes in cable lengths. After going through a decision feedback equalizer (DFE) 620 (explained later), a DSP 628 outputs the result as a received digital signal. The amplitude equalizer not only performs a function of correcting frequency-amplitude characteristics but also performs a so called AGC (Automatic Gain Control) function. These two functions may be depicted as different blocks.

Meanwhile, the digital signal 623 inputted to the DSP 628 is outputted as a digital transmission signal, after a COD 624 performs the necessary processes on the digital signal (such as conversions from binary values to multiple values). Thus, the transmission signal outputted from the DSP 628 is converted to an analog signal. An emission side low pass filter (SLF) 626 limits the bands of the analog signal to the intraband component determined by the sampling frequencies. Then, a driver circuit (DRV) 627 sends it from the analog communications line 611 through the hybrid transformer 612 to the subscriber.

Here, since a part of the emission signal bound for the analog transmission line 611 is supplied to the reception side as echo components through the hybrid transformer 612, that part is included in the digital reception signal to be inputted to the DSP 628 and, the reception side needs to cancel the echo components. Therefore, an echo canceler (EC) 621 generates the above components as echo replica components from the digital emission signal. When the subtracter 615 subtracts the above components from the digital reception signal, the echo components are canceled. In this case, the outputs from the amplitude equalizer 619 on the reception side are supplied to the decision feedback equalizer 620, so that the generation of the echo replica components at the echo canceler 621 is adaptively controlled per the digital reception signal. The control is performed per coefficient correction signals 629 outputted from the decision feedback equalizer 620, which signals are also supplied to the coefficient converter 618 in the digital variable lag equalizer 616, as described later.

The above respective functions of the DSP 628 are realized as combinations of the hardware of the DSP 628 and the microprograms for its operation.

The following is a sequential description of first, second and third embodiments of the digital variable lag equalizer 616 shown in FIG. 20.

Figure 21:
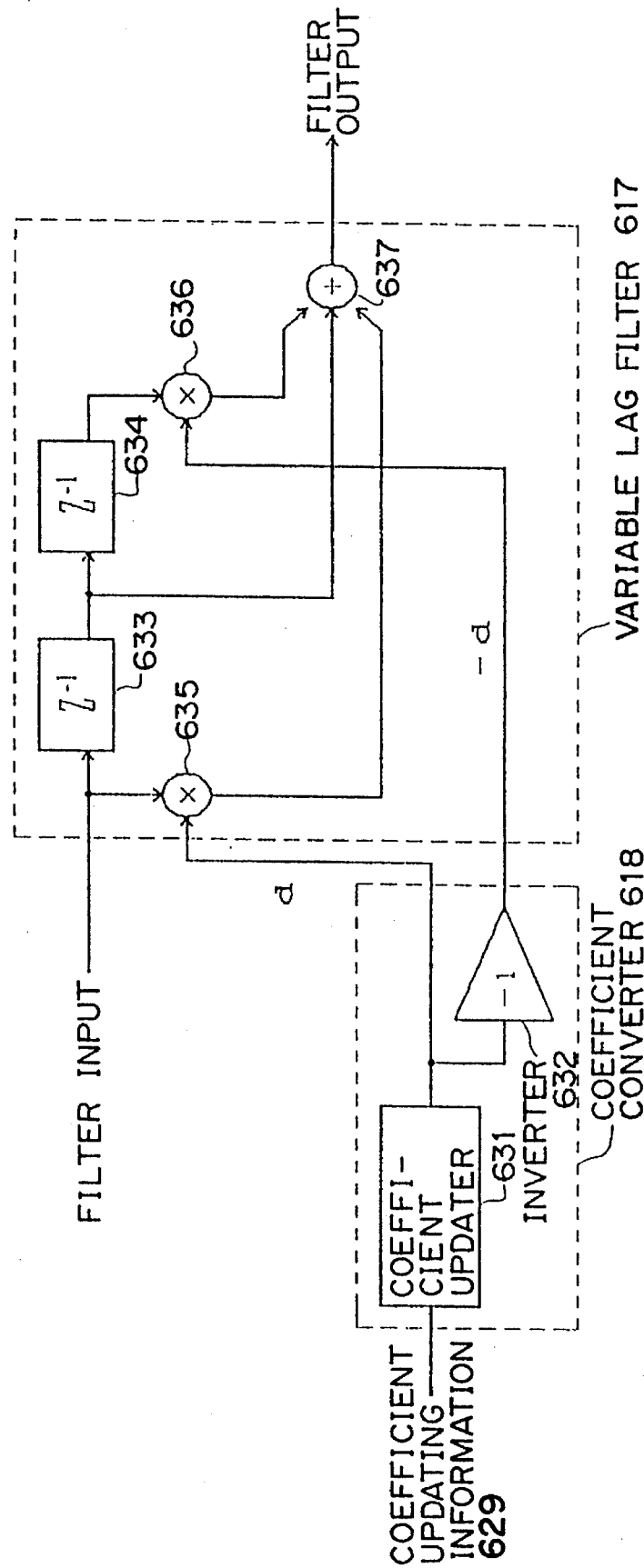
FIG. 21 is a block diagram of an embodiment of a digital variable lag equalizer according to the present invention.

FIG. 21 shows the configuration of an embodiment of the digital variable lag equalizer 616 shown in FIG. 20.

First, the variable delay filter 617 comprises a lag element 633 for lagging filter inputs by a half sampling period, a lag element 634 for further lagging outputs from the lag element 633 by a half sampling period, a multiplier 635 for multiplying filter inputs by a filter coefficient d, a multiplier 636 for multiplying outputs from the lag element 634 by a filter coefficient −d, and an adder 637 for adding the respective outputs from the multipliers 635 and 636, and the lag element 633 and for outputting the sum as the filter output. This forms a second-order transversal filter with three taps, where the coefficient of the center tap has a fixed value "1", the coefficients of the other two taps have the values "d" and "−d", so that they have the same absolute values but have the opposite signs. The coefficient converter 618 is formed by a coefficient updater 631 and an inverter 632.

The operations of the embodiment of the digital variable lag equalizer 616 having the above configuration are explained below.

The transmission function of the variable delay filter 617 shown in FIG. 21 is given as $$H(z^{-1}) = d + z^{-1} - d \cdot z^{-2} \qquad (10)$$

where
$z^{-1} = \exp(-j \cdot \omega \cdot T/2)$
$\omega$: angular frequency
T: baud rate period The reason why the operations are performed at a speed twice the baud rate frequency (½ of the baud rate period T) is because a digital filter has better characteristics when using higher operating frequencies so that the lag characteristics in low frequency ranges are used, since the frequency range up to the ¼ of the sampling frequencies of the filter has lag characteristics opposite to those of the frequency range between ¼ and ¾.

Transforming equation (10), $$H(z^{-1}) = z^{-1}(d \times z^{+1} + 1 - d \times z^{-1})$$
$$= z^{-1}[1 + j2d \times \sin(\omega \times T)]$$

if $|| \leq 0.4$, the absolute value of the solution $H(z^{-1})$ does not become too much larger than 1, because the term $2d \cdot \sin(\omega \cdot T)$ has a phase at 90 degrees to the immediately preceding term 1.

Therefore, the filter 617 acts as a variable lag filter for varying delay between input and output signals by altering the value of a filter coefficient d.

In this case, strictly speaking, it needs to be examined whether or not the frequency characteristics of the lag in equation (10) are sufficiently flat. However, since a digital subscriber line transmission interface unit for transmitting multi-value pulse signals only takes the amplitudes at sampling points into consideration and only discrete amplitude values such as ±1 and ±3 are used, it does not matter much.

Figure 22:
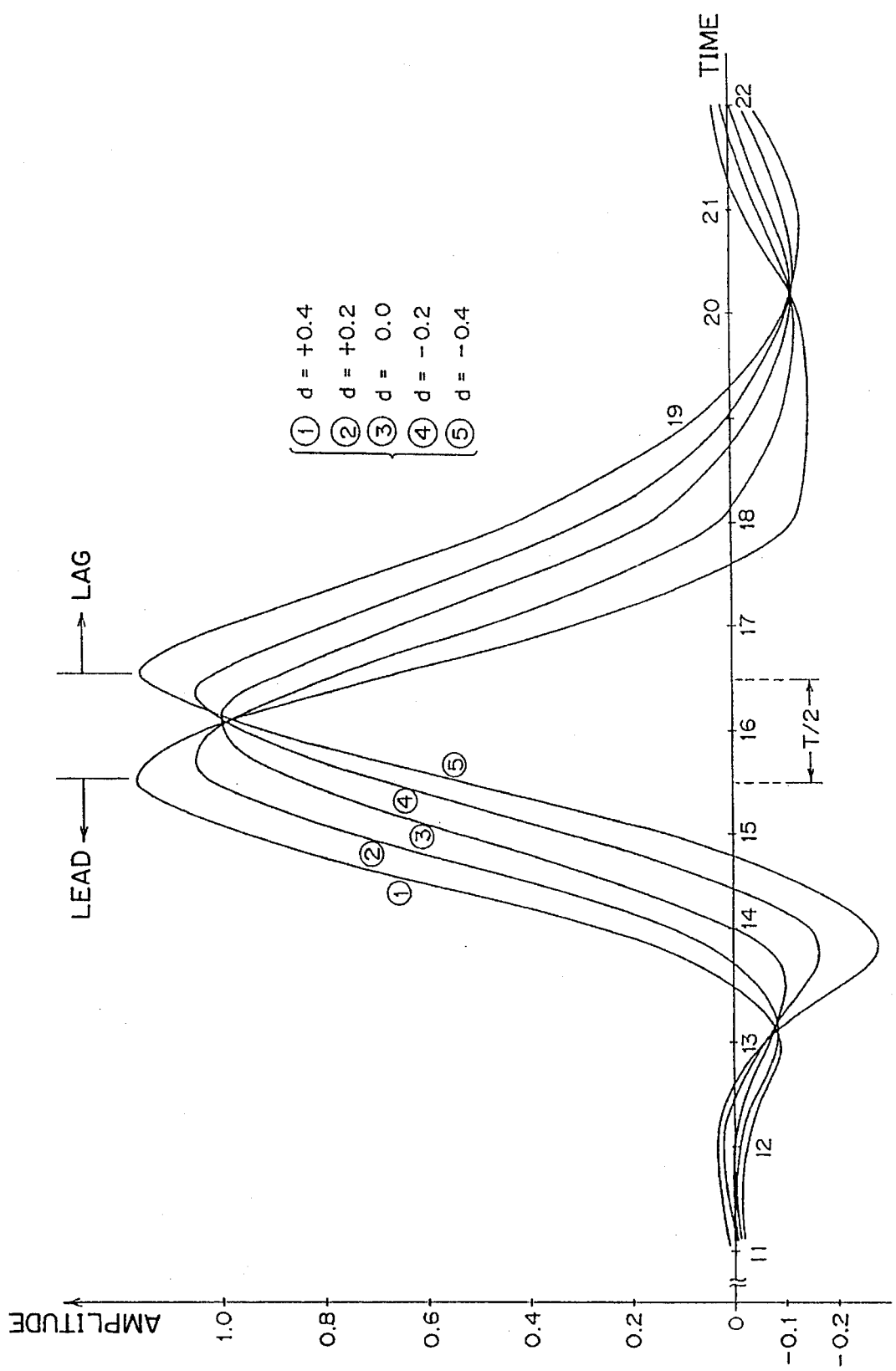
FIG. 22 is a graph of the characteristics of the embodiment of a digital variable lag equalizer shown in FIG. 21.

FIG. 22 shows a pulse response waveform when the variable delay filter 617 shown in FIG. 21 having the frequency characteristics expressed as equation (10) receives a single-pulse waveform. In FIG. 22, [3] indicates a pulse response waveform when filter coefficient d is expressed as d=0, where a waveform the same as the input waveform is outputted after being lagged by $z^{-1}$, i.e. T/2. On the other hand, when d changes between 0.4 and −0.4, the output waveform changes as shown in [1] through [5] in FIG. 22. Although the peak value changes significantly, good lag characteristics can be obtained in terms of shifting the pulse position.

Here, the coefficient updater 631 updates the filter coefficient d based on the coefficient updating information 629 from the decision feedback equalizer 620. The inverter 632 produces the coefficient −d as the inversion of the sign of the coefficient d. The operations of the coefficient updater 631 are explained later.

Figure 23:
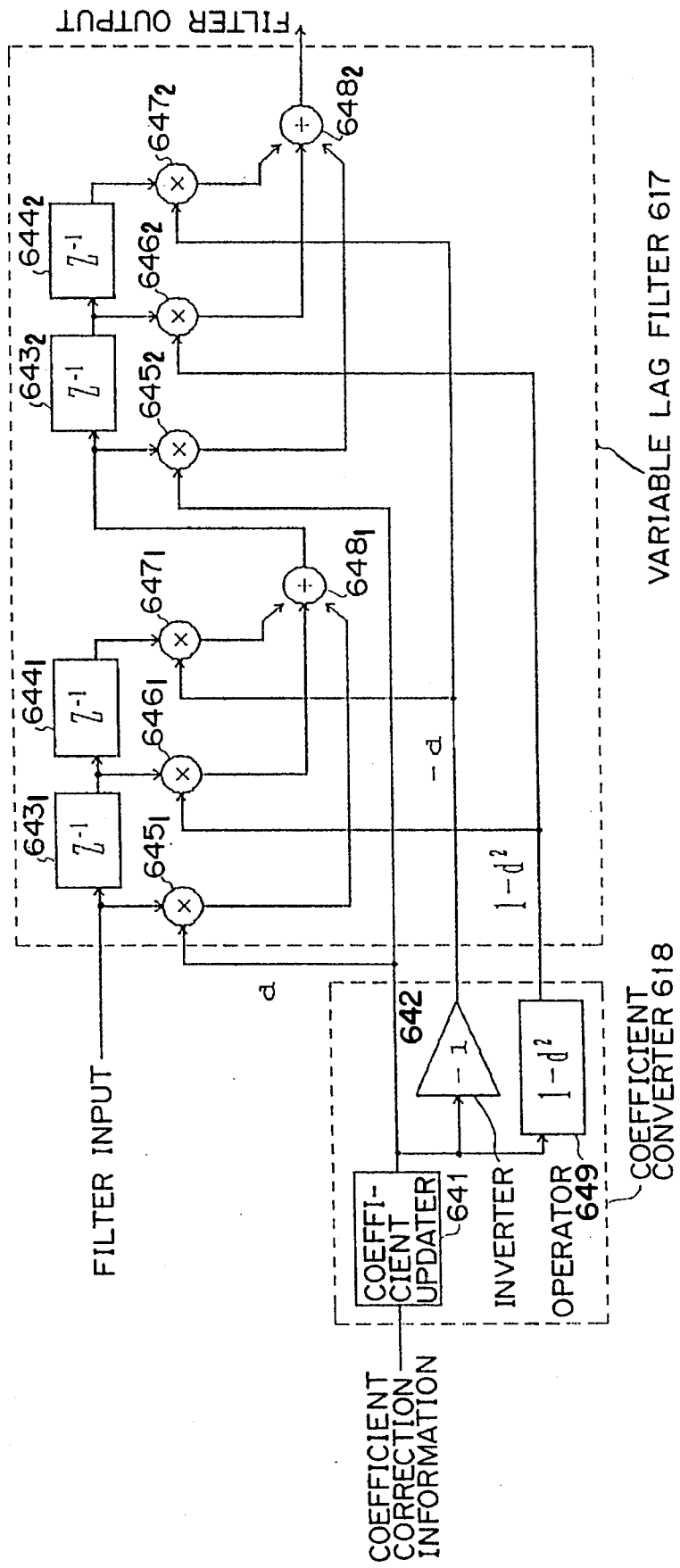
FIG. 23 is a block diagram of an embodiment of a digital variable lag equalizer according to the present invention.

FIG. 23 shows the configuration of another embodiment of the digital variable lag equalizer 616 shown in FIG. 20.

The variable lag filter 617 comprises a lag element 643₁ for lagging the filter input by a half sampling time period, a lag element 644₁ for further lagging the output from the lag element 643₁, a multiplier 645₁ for multiplying the filter input by the filter coefficient d, a multiplier 646₁ for multiplying the output from the lag element 643₁ by a filter coefficient $1-d^2$, a multiplier 647₁ for multiplying the output from the lag element 644₁ by the filter coefficient −d, and an adder 648₁ for adding the respective outputs from the multipliers 645₁, 646₁ and 647₁. In addition, there are configuring elements 643₂ through 648₂ configured exactly the same as the above configuring elements 643₁ through 648₁. The output from the adder 648₂ is outputted as the filter output. The coefficient converter 618 comprises a coefficient updater 641, an inverter 642 and an operator 649 for calculating the coefficient $1-d^2$.

In the embodiment shown in FIG. 22, pulse amplitudes change when lags are changed. An embodiment shown in FIG. 23 takes care of this, by making the amplitude of the center tap $1-d^2$ instead of a constant value. FIG. 23 shows the embodiment providing a two-stage serial connection of transversal filters having the following transmission function:

$$H(z^{-1}) = d + (1-d^2)z^{-1} - d \cdot z^{-1} \quad (11)$$

Here, the coefficient converter 218 has the operator 649 which calculates the value of $1-d^2$ by using a filter coefficient d obtained by the coefficient updater 641 and supplies the value to not only the center tap of the first stage but also the center tap of the second stage.

Figure 24:
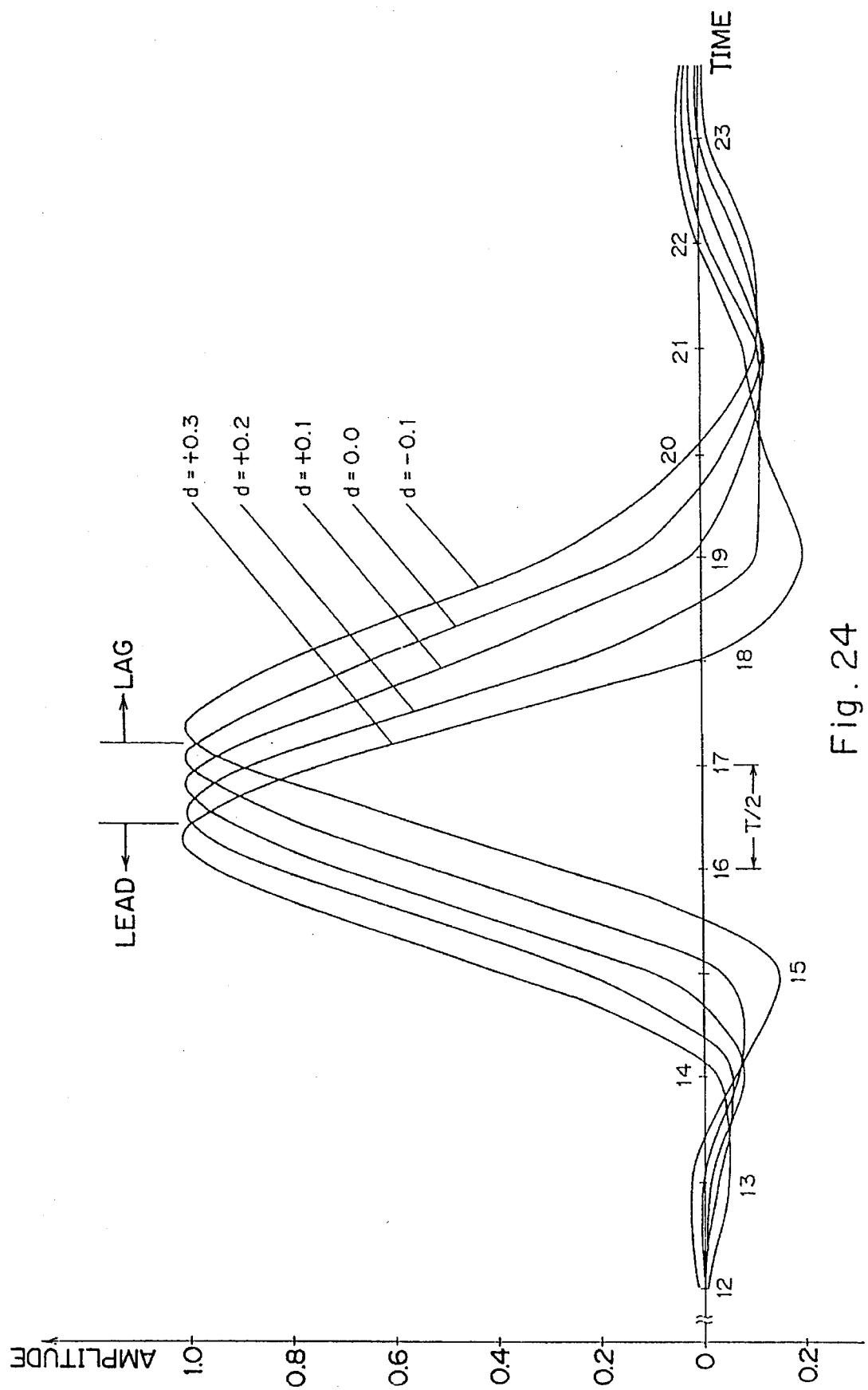
FIG. 24 is a graph of the characteristics of the embodiment of a digital variable lag equalizer shown in FIG. 23.

FIG. 24 shows a response waveform when the variable lag filter 617 shown in FIG. 20 having the frequency characteristics expressed as equation (1) receives a single pulse waveform. As shown in FIG. 24, since the peak value is constant and the ripples are small over a long range of the skirts, the characteristics are very good.

Also, the phase change is large enough, exceeding T/2. In this case, since the shift by T/2 is easily produced by one tap of the transversal filters, the signal needs to be variably lagged only by the time t of $0 \leq t \leq T/2$.

The coefficient updater 641 has the same functions as those of the coefficient updater 301 shown in FIG. 21. Their operations are described later.

Figure 25:
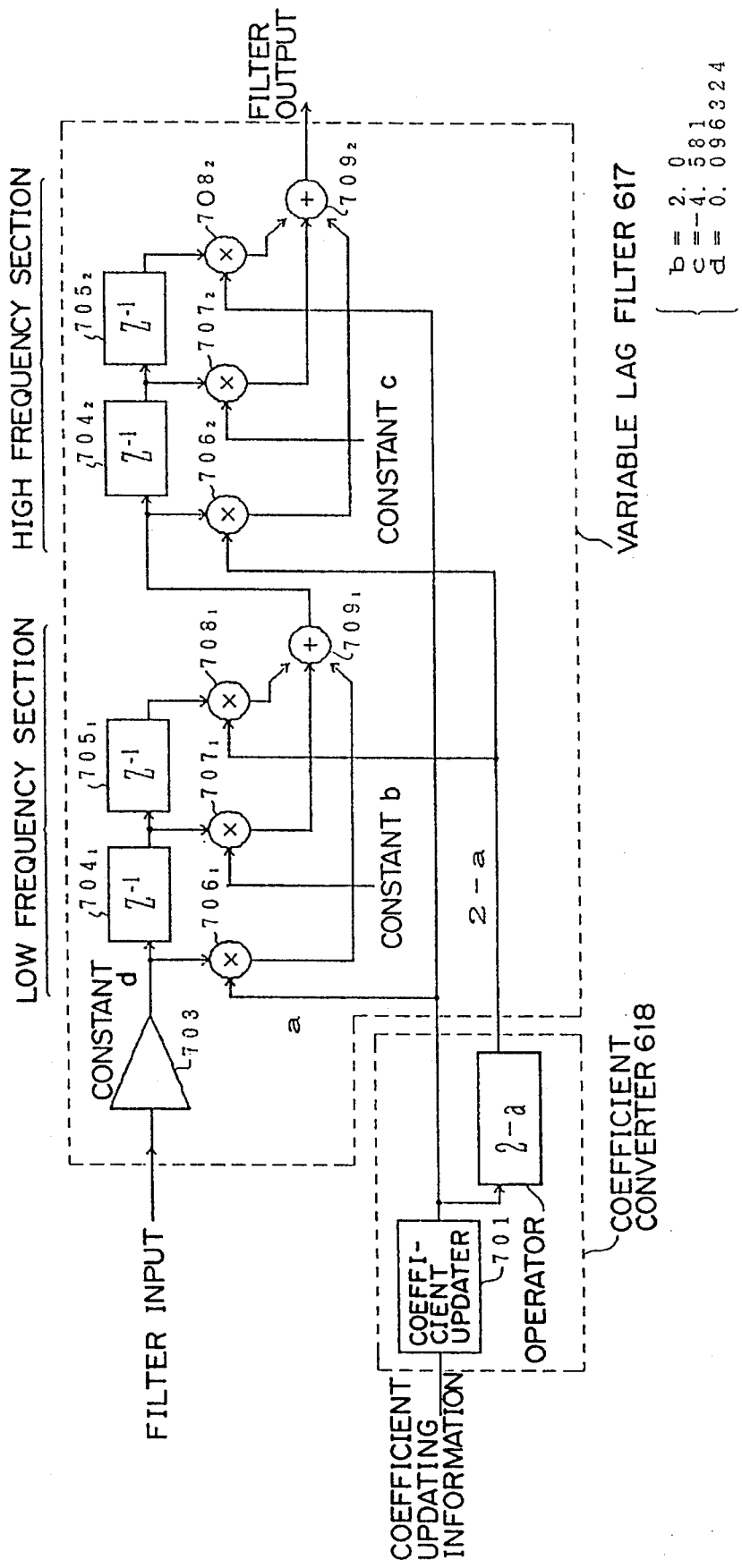
FIG. 25 is a block diagram of an embodiment of a digital variable lag equalizer according to the present invention.

Next, FIG. 25 shows the configuration of a further embodiment of the digital variable lag equalizer 616 shown in FIG. 20.

The variable lag filter 217 has a constant multiplier 703 for multiplying the filter inputs by constant d, a lag element 704₁ for lagging the output by a half sampling time period, a lag element 705₁ for further lagging the output from the lag element 704₁, a multiplier 706₁ for multiplying the output from the constant multiplier 703 by the filter coefficient a, a multiplier 707₁ for multiplying the output from the lag element 704₁ by a constant b, a multiplier 708₁ for multi-plying the output from the lag element 705₁ by the filter coefficient 2−a, and an adder 709₁ for adding the respective outputs from the multipliers 706₁, 707₁ and 708₁. In addition, there are configuring elements 704₂ through 709₂ configured exactly the same as the above configuring elements 704₁ through 709₁. The output from the adder 709₂ is outputted as the filter output. What is new is that the multiplier 706₂ multiplies using the filter coefficient 2−a, the multiplier 707₂ multiplies using the constant c, and the multiplier 708₂ multiplies using the filter coefficient a. The coefficient converter 218 comprises a coefficient updater 701 configured the same as the coefficient updater 631 shown in FIG. 21 and an operator 702 for calculating the coefficient 2−a.

The actions of the third embodiment of the above digital variable lag equalizer 616 are described below.

Assume now that filters have the characteristics defined by the following transmission function:

$$H(z^{-1}) = [0.096324(1 + 2z^{-1} + z^{-2})(1 - 4.581z^{-1} + z^{-2})]^2 \quad (12)$$

where $Z^{-1} = \exp(-j\omega T/2)$

ω: angular frequency

T: baud rate period

If T=12.5 micro seconds, the gain characteristics are as follows: 0 dB at 0 kHz frequency, 6 dB at 40 kHz and negative infinity at 80 kHz. Since the lag characteristics are constant because of the flat lag function, which shows a 100% roll-off characteristics for a transmission system having a speed of 80 kbaud (kilo bauds). Hence, even if a single pulse response waveform whose band is restricted to no greater than 80 kHz is used as the input to equation (12), the waveform distortion wouldn't arise.

In order to lag the waveform by using the above low-pass filter, the following is done. Since the term in the first rounded parentheses of equation (12) has a value 4 at $z^{-1}=1$, i.e. at 0 kHz, and a value 0 at $z^{-1}=-1$, i.e. at 160 kHz, the function has good sensitivity at low frequencies. That is, it forms a low frequency range section. Meanwhile, since the term in the second rounded parentheses of equation (12) has a value 2.58 at $z^{-1}=1$, i.e. at 0 kHz, a value 4.58 at $z^{-1}=j$, i.e. at 40 kHz, and a value 6.58 at $z^{-1}=-1$, i.e. at 160 kHz. Since the values increase as the frequencies increase, the function has good sensitivity at high frequencies. That is, it forms a high frequency range section.

Thus, if the respective terms are simultaneously adjusted for lags the entire waveform can be shifted "as is". By examining the respective terms of equation (12) from this point of view, it is clear that those terms are made up of sums of a constant, a first order term of $Z^{-1}$ and second order term of $Z^{-1}$. When the term in the first degree is used as the reference, the constant terms indicate signals advanced by T/2, and the second degree terms indicate signals lagged by T/2. If the constant terms are made larger and the second degree terms are made smaller, the advance terms become larger, the outputs are expected to lag less. If, on the other hand, the constant terms are made smaller and the second degree terms are made larger, the waveform lags (relatively) more. In reality, although this holds true for the terms in the first rounded parentheses, the sensitivities of the respective tap coefficients for the lag characteristics in the second term is opposite to the sensitivities in the first term, since the term in the second round parentheses is highly sensitive to high frequencies, as described earlier. Therefore, this embodiment introduced a variable parameter a to equation (12) for expressing the transmission characteristics of the variable lag filter 617.

$$H(z^{-1}) = [0.096324(a+2z^{-1}+(2-a)z^{-2}) \cdot ((a-2)-4.581z^{-1}+az^{-2})]^2 \quad (13)$$

Equation (13) is the same as equation (12) when a=1. When the value a is increased, the constant term indicating the phase lead of the terms in the first rounded parentheses highly sensitive to the low frequencies becomes large, and the second degree terms indicating the phase lag becomes small. Further, since the terms in the second rounded parentheses have opposite relations, the waveforms are expected to advance as a whole. The variable lag filter 617 shown in FIG. 25 realizes the above transfer characteristics expressed by equation (13) described above.

Figure 26:
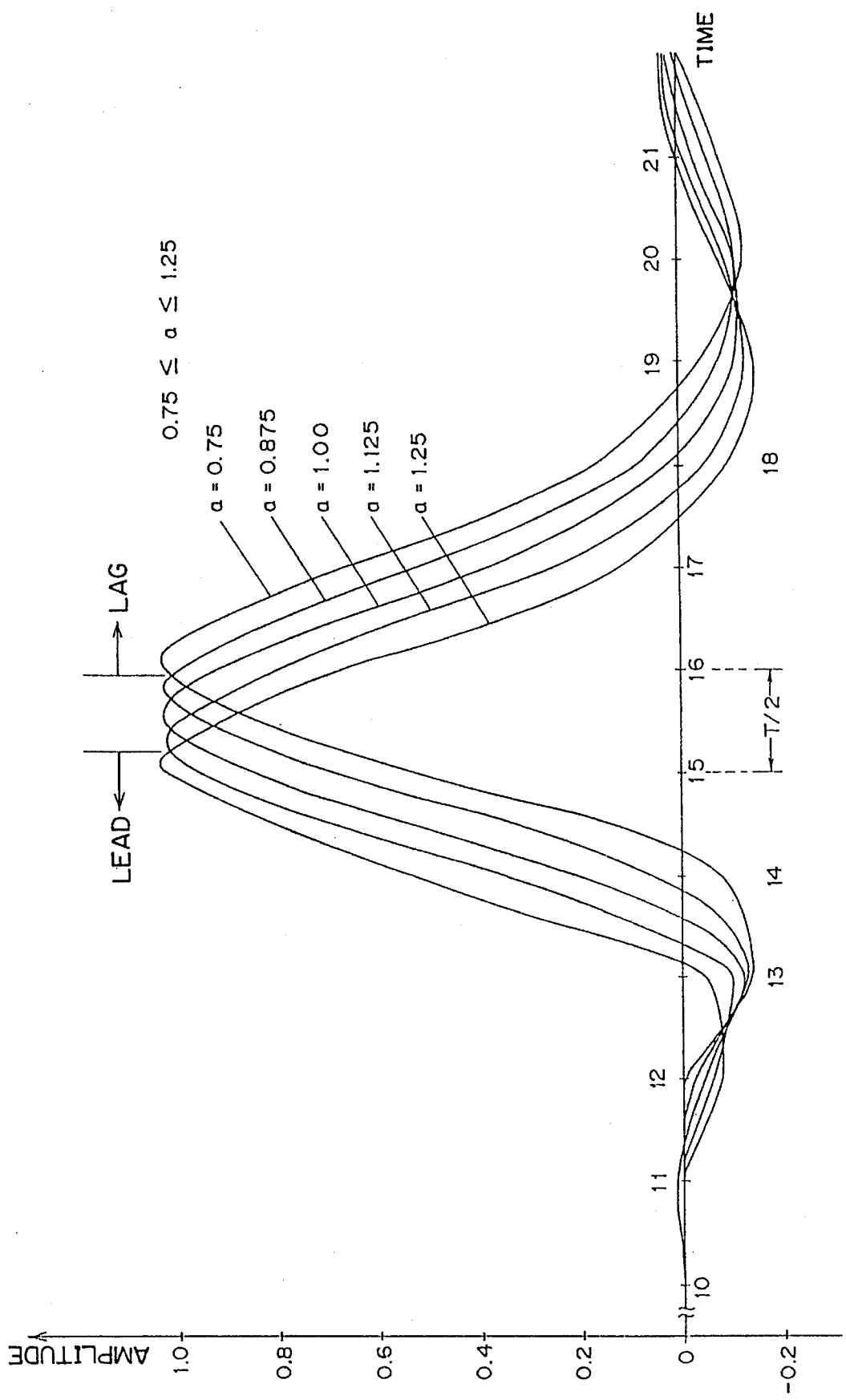
FIG. 26 is a graph of the characteristics of the embodiment of a digital variable lag equalizer shown in FIG. 25.

FIG. 26 shows the response waveforms, when the variable lag filter 617 having lag frequency characteristics expressed as equation (13) receives a single pulse waveform. The inputted waveform approximates the waveform at a=1, and it is understood that the lag corresponding to T/2 is obtained by $0.75 \leq a \leq 1.25$.

The coefficient updater 701 has the same function as the coefficient updater 631 shown in FIG. 21 and the coefficient updater 641 shown in FIG. 23. Its operations are described later.

Equation (13) and FIG. 25 show a case in which the transmission characteristics of the variable lag filter 617 in the third embodiment of the digital lag variable equalizer 616 described above have a two-stage configuration comprising a high frequency range section and a low frequency range section. A further generalization of equation (13) produces the transmission characteristics expressed by the following equation.

$$H(z^{-1}) = [a_k + b_k z^{-1} + (2-a_k)z^{-2}]^n X [(2-a_j) + c_j z^{-1} + a_j z^{-2}]^m \quad (14)$$

where
$z^{-1} = \exp.(-j \cdot \omega \cdot T2)$
T=baud rate period
$\omega$=angular frequencies
2n+2m=filtering order
k=0, 1, 2, ... and n−1
j=0, 1, 2, ... and m−1

Here, the number of filter stages n and m can be any integers. When n and m change, values $b_k$ and $c_j$ change. Value $b_k$ is always close to 2.0, however, since the transmission characteristics need to be close to the characteristics of a roll-off filter. When the variable lag filter 617 shown in FIG. 20 has the transmission characteristics of equation (14), by having the coefficient converter 618 control the value of tap coefficient $a_k$ of a part or all of n sections and the value of tap coefficient $a_j$ of a part or all of m sections, desired waveform lag characteristics are obtained. The number of parameters to be controlled can be reduced by setting the value of tap coefficient $a_k$ of a part or all of n sections and the value of tap coefficient $a_k$ of a part or all of m sections to the same value a and by having the coefficient converter 618 control the value a.

Next, the operations of the coefficient updater 631 (FIG. 21), the coefficient updater 641 (FIG. 23) and the coefficient updater 701 (FIG. 25) of the coefficient converter 618 respectively in the embodiments, shown in FIG. 21, 23 and 25, of the digital variable lag equalizer 616 are described below.

The coefficient updater 631 (641 or 701) updates the value of the coefficient d or a (Refer to FIGS. 21, 23 and 25) both being the tap coefficients of the variable lag filter 617, per the coefficient correction information 629 from the decision feedback equalizer 620 shown in FIG. 20.

In this case, the precursor value from the decision feedback equalizer 620 is used as the coefficient correction information 629. A precursor is defined as the amplitude value at one sampling time preceding the sampling time when a single pulse response waveform shown in FIG. 7B has the maximum amplitude. Since input signals to a digital subscriber line transmission interface unit such as one illustrated in the embodiment shown in FIG. 20 go through a lot of circuit networks such as a decimation filter in the A/D converter 614, generally, the single pulse response has one or two ripples before it reaches the maximum value and changes from a negative value to a positive value in the vicinity of a precursor. A waveforming filter may be provided for changing the single pulse response from negative to positive in the vicinity of the precursor.

Figure 27:
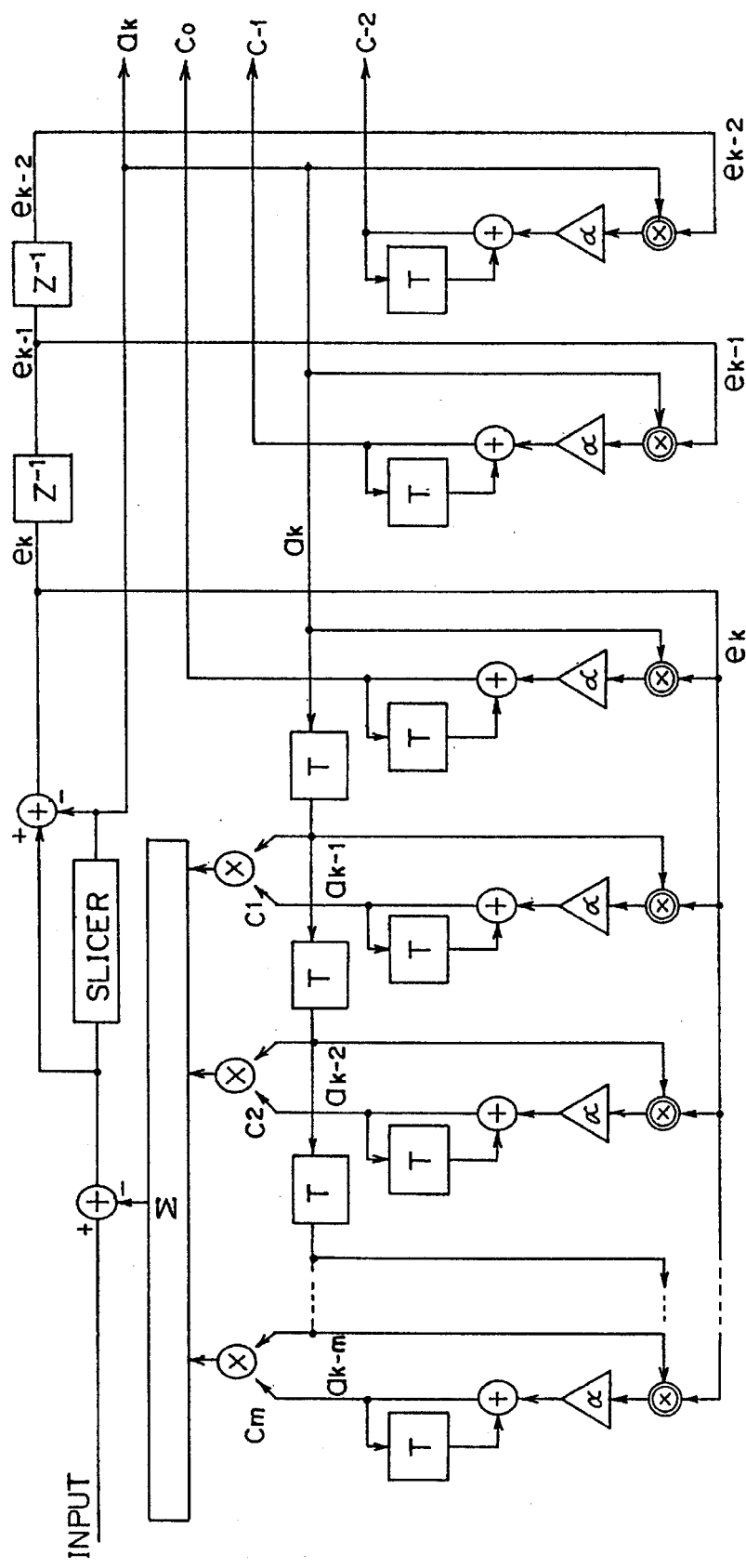
FIG. 27 is a block diagram of an exemplary configuration of a decision feedback equalizer.

FIG. 27 shows an exemplary circuit of the decision feedback equalizer 620 for generating such precursor values. Although the explanation of its detailed operation is omitted here, since such an exemplary circuit is very common, $C_{-1}$ in FIG. 27 becomes the precursor value. A calculation of precursor $C_{-1}$ is briefly explained as follows. When a precursor at time k is provided as $C_{-1,k}$, the precursor at time k+1 is given by the following expression.

$$C_{-1,k+1} = C_{-1,k} + \alpha e_{k-1} \, a_k$$

where both $e_{k-1}$ and, ak are the output data of the decision feedback equalizer, $e_{k-1}$ is an error at time k−1, and $a_k$ is a symbol value of the decision at time k and a is a small positive number.

When a main cursor at time k is provided as $C_{0,k}$ the main cursor at time k+1 is given by the following expression.

$$C_{0,k+1} = C_{0,k} + \alpha e_{k-1} \, a_{k-1}$$

The above expression designates that a calculation of the main cursor utilizes a product of a symbol value at a certain period and an error at the same period and that a calculation of the precursor utilizes a product of the symbol value of a certain period and an error at the previous period. The above equation can also be obtained in the following manner.

$$C_{0,k+1} = C_{0,k} + \alpha e_{k-ak}$$

The precursor value is stochastically computed similarly to the tap coefficients in the decision feedback equalizer 620. When the phase lag is correct, it becomes a small value close to 0, but when the phase lag is incorrect, it becomes a positive or negative value having a large absolute value.

The coefficient updater 631 641 (or 701) changes the coefficients per the precursor, so that the lag in the variable lag filter 617 becomes large when the precursor value is positive, or so that the lag in the variable delay filter 617 becomes small when the precursor value is negative. As a rule for calculating the change, generally, the maximum gradient method is used.

This embodiment enables signal timings (lags) to be easily adjusted by having coefficient converting means change the tap coefficients of digital filtering means. This invention enables power consumption to be reduced when digital filtering means is formed, e.g., by a digital signal processor, because of the lower processing load, since there is only one kind of filtering process.

Especially, if this embodiment is used on the network side of a digital subscriber line transmission interface system, when the digital subscriber line transmission interface unit is used, after the echo canceler is converged, a decision feedback equalizer and an amplitude equalizer, as other parts of the receiver, can be adjusted, while the echo canceler is kept at the current state. This embodiment has an effect of enabling network side devices to be initialized systematically and simply.

What is claimed is:

1. A digital adaptive equalizer for equalizing input signals through digital filtering operations by changing filtering coefficients based on a predetermined parameter characterizing the digital filtering operations, comprising:

parameter means for supplying the predetermined parameter indicative of equalization required for the input signals;

coefficient calculating means for calculating the filtering coefficients by using the predetermined parameter as an input to functions corresponding to the filtering coefficients; and filtering operation executing means for executing the digital filtering operations on the input signals based on the filtering coefficients to produce filtered signals.

2. A digital adaptive equalizer, connected to provide output signals supplied to a decision feedback equalizer, adaptively equalizing input signals by executing digital filtering operations by changing filtering coefficients, based on a predetermined parameter characterizing the digital filtering operations, comprising:

coefficient calculating means for calculating the filtering coefficients by supplying a value of the predetermined parameter as an input to functions corresponding to the filtering coefficients;

parameter updating means for sequentially optimizing the value of the predetermined parameter based on a decision symbol and an output error outputted from the decision feedback equalizer; and filtering operation executing means for executing digital filtering operations on the input signals based on the filtering coefficients to supply the output signals to the decision feedback equalizer.

3. The digital adaptive equalizer according to claim 2, wherein said parameter updating means is included in the decision feedback equalizer to directly obtain the value of the predetermined parameter for calculating filtering coefficients as an output from the decision feedback equalizer.

4. The digital adaptive equalizer according to claim 2, wherein the decision feedback equalizer outputs the value of the predetermined parameter obtained by performing any one of the following processing, in addition to the processing executed by an ordinary decision feedback equalizer:

$$X_{k+1}=x_k-\alpha \cdot \text{sign}(a_k) \cdot \text{sign}(e_k)$$

$$X_{k+1}=x_k-\alpha \cdot a_k \cdot \text{sign}(e_k)$$

$$X_{k+1}=x_k-\alpha \cdot a_k \cdot e_k$$

where:

$x_k$: parameter value at time k $a_k$: decision symbol at time k $e_k$: output error at time k $\alpha$: a very small real number having a sign determined so that $x_k$ is converged to a constant value sign (A): −1 when A<0, 1 when A≧0.

5. The digital adaptive equalizer according to claim 1, wherein functions corresponding to the filtering coefficients are approximated by storing plural sets each including one value of the predetermined parameter and values of the filtering coefficients corresponding thereto.

6. The digital adaptive equalizer according to claim 1, wherein said filtering operation executing means is a transversal type filter.

7. The digital adaptive equalizer according to claim 1, wherein the functions corresponding to the filtering coefficients are defined as n order linear polynomials with input variables determined by the value of the predetermined parameter.

8. The digital adaptive equalizer according to claim 1, wherein the functions corresponding to the filtering coefficients are defined as exponential functions with input variables determined by the value of the predetermined parameter.

9. The digital adaptive equalizer according to claim 1, wherein the predetermined parameter has a value corresponding to a cable length of a cable over which the input signals are transmitted.

10. A line equalizer for equalizing input signals, comprising:

a decision feedback equalizer forming tap coefficients of a main cursor together with tap coefficients of a post-cursor; and an automatic gain control amplifier receiving the input signals, outputting an amplified signal to said decision feedback equalizer and receiving from said decision feedback equalizer, as a gain control signal, a signal corresponding to the tap coefficients of the main cursor.

11. A line equalizer for equalizing input signals, comprising:

a decision feedback equalizer forming tap coefficients of a main cursor together with tap coefficients of a post-cursor; and a $\sqrt{f}$ equalizer receiving the input signals, outputting an amplified signal to said decision feedback equalizer and receiving from said decision feedback equalizer, as coefficient control signals, a signal corresponding to the tap coefficients of the main cursor.

12. A timing adjustment apparatus for adjusting phase delay of signals from a filter, comprising:

digital filtering means of a transversal type which has transfer characteristics including a term for wave-forming, for filtering a received signal to produce an output signal including timing control information, said digital filtering means being a variable lag filter having tap coefficients for adjusting the phase delay of the received signal prior to output of the output signal; and coefficient converting means for converting at least one piece of the timing control information obtained from the output signal of said digital filtering means into a part or all of the tap coefficients of said digital filtering means.

13. The timing adjustment apparatus according to claim 12, wherein said digital filtering means comprises at least one stage of a three-tap transversal-type lag equalizer having end taps with tap coefficient values d and −d and a center tap with a tap coefficient value 1, d being a real number; and wherein said coefficient converting means comprises:

coefficient updating means for updating the coefficient value d based on the timing control information; and inverting means for receiving the coefficient value d and outputting the coefficient value −d.

14. The timing adjustment apparatus according to claim 12, wherein said digital filtering means is formed by at least one stage of a three-tap transversal-type lag equalizer having end taps with tap coefficient values d and −d and a center tap with a tap coefficient value $(1-d^{-2})$, d being a real number; and wherein said coefficient converting means comprises:

coefficient updating means for updating the coefficient value d based on the timing control information;

inverting means for receiving the coefficient value d and outputting the coefficient value −d; and calculating means for calculating the coefficient value $(1-d^{-2})$ from the coefficient value d.

15. The timing adjustment apparatus according to claim 12, wherein said digital filtering means is formed by a transversal-type filter having transmission characteristics $$H(z^{-1})=[a_k+b_k z^{-1}+(2-a_k)z^{-2}]^n \, [(2-a_j)+c_j z^{-1}+a_j z^{-2}]^m$$

where $z^{-1}=\exp.(-j\cdot\omega T)$

T=baud rate period $\omega$=angular frequency

2n+2m=filter order k=0, 1, 2, . . . and n−1 j=0, 1, 2, . . . and m−1; and wherein said coefficient converting means calculates tap coefficient values $a_k$ for at least a part thereof and tap coefficient values $a_j$ for at least a part thereof, based on the timing control information.

16. The timing adjustment apparatus according to claim 12, wherein said digital filtering means is formed by a transversal-type filter having transmission characteristics $$H(z^{-1})=[a_k+b_k z^{-1}+(2-a_k)z^{-2}]^n \, [(2-a_j)+c_j z^{-1}+a_j z^{-2}]^m,$$

where $z^{-1}=\exp.(-j\cdot\omega T/2)$

T=baud rate period $\omega$=angular frequency

2n+2m=filter order k=0, 1, 2, . . . and n−1 j=0, 1, 2, . . . and m−1; and wherein said coefficient converting means calculates a single value a for corresponding tap coefficient values $a_k$ and tap coefficient values $a_j$ for at least a part thereof, based on said timing control information.

17. The timing adjustment apparatus according to claim 12, wherein said digital filtering means operates at speeds producing not less than two sampling values per a baud rate period of the received signals.

18. The timing adjustment apparatus according to claim 12, further comprising a decision feedback equalizer connected to a final stage of said digital filtering means and producing signals;

wherein said timing control information comprises precursor values of a single pulse waveform of the signals obtained from said decision feedback equalizer; and wherein said coefficient converting means adaptively obtains at least a part of the tap coefficients of said digital filtering means based on the precursor values, so that the precursor values become zero.

* * * * *

UNITED STATES PATENT AND TRADEMARK OFFICE
CERTIFICATE OF CORRECTION

PATENT NO. : 5,481,564
DATED : January 2, 1996
INVENTOR(S) : Mitsuo KAKUISHI et al.

It is certified that error appears in the above-indentified patent and that said Letters Patent is hereby corrected as shown below:

Column 1, line 7, delete "and" (first occurrence).

Column 2, line 11, "bit" should be --bits--;

line 11, after "loss" insert --characteristics--;

line 52, delete "of"; and line 67, after "9" insert --and--.

Column 3, line 2, delete "2" and insert --9--; and line 21, delete "the" and insert --a-- therein.

Column 4, line 51, delete "the" (first occurrence) and insert --a--.

Column 7, line 60, delete "in" and insert --of--; and line 67, "function" should be --functions--.

Column 8, line 33, "FIG." should be --FIGS.--.

Column 9, line 25, after "e.g." insert --,--.

Column 10, line 2, delete "such".

UNITED STATES PATENT AND TRADEMARK OFFICE
CERTIFICATE OF CORRECTION

PATENT NO. : 5,481,564
DATED : January 2, 1996
INVENTOR(S) : Mitsuo KAKUISHI et al.

It is certified that error appears in the above-indentified patent and that said Letters Patent is hereby corrected as shown below:

Column 12, line 14, after "e.g." insert –,–.

Column 13, line 24, "coefficient" should be –coefficients–.

Column 14, line 57, delete "correc-"; and line 58, delete "tion".

Column 15, line 52, "-3.]," should be – -3],–; and line 66, "$C_{i,k}(9)=C$" should be –$C_{i,k+1}=C$–.

Column 17, line 22, after "to" insert –the present invention. A line equalizer of–.

Column 18, line 44, delete "stage of".

Column 19, line 16, delete "521".

Column 20, line 24, "j·ω·T) should be –j·ω·T/2)–; and line 58, delete "means" and insert –unit– therein.

Column 26, line 21, after "ak" insert –)–; and line 45, "631 641 (or 702)" should be –631 (641 or 701)–.

UNITED STATES PATENT AND TRADEMARK OFFICE
CERTIFICATE OF CORRECTION

PATENT NO. : 5,481,564
DATED : January 2, 1996
INVENTOR(S) : Mitsuo Kakuishi, et. al.

It is certified that error appears in the above-indentified patent and that said Letters Patent is hereby corrected as shown below:

Column 26, line 21, after "ak" insert --)--; and line 45, "631 641 (or 702)" should be --631 (641 or 701)--.

Signed and Sealed this

Fourth Day of June, 1996

BRUCE LEHMAN

*Attest:*

*Attesting Officer*  *Commissioner of Patents and Trademarks*